(12) United States Patent
Allen et al.

(10) Patent No.: US 11,725,746 B2
(45) Date of Patent: **\*Aug. 15, 2023**

(54) LOW WATER HAMMER BREAK CHECK VALVE

(71) Applicant: Mueller International, LLC, Atlanta, GA (US)

(72) Inventors: Sean Michael Allen, Chattanooga, TN (US); Justin Blaine Childress, Albertville, AL (US); Christopher Joseph Duckett, Albertville, AL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,659

(22) Filed: Jun. 7, 2021

(65) Prior Publication Data
US 2022/0390037 A1    Dec. 8, 2022

(51) Int. Cl.
*F16K 47/02*    (2006.01)
*E03B 9/02*    (2006.01)
*F16K 31/122*    (2006.01)
*F16K 15/03*    (2006.01)

(52) U.S. Cl.
CPC .............. *F16K 47/023* (2013.01); *E03B 9/02* (2013.01); *F16K 15/038* (2013.01); *F16K 31/1223* (2013.01)

(58) Field of Classification Search
CPC ...... F16K 15/036; F16K 15/038; F16K 15/03; F16K 47/023; F16K 47/02; F16K 47/0112; F16K 47/011; F16K 47/01; F16K 17/363; F16K 27/006
See application file for complete search history.

(56) References Cited

U.S. PATENT DOCUMENTS

| | | | | |
|---|---|---|---|---|
| 970,598 | A | * | 9/1910 | Arnold ................. F16K 15/038 137/518 |
| 1,065,023 | A | * | 6/1913 | Blood .................. F16K 15/038 251/285 |
| 1,487,038 | A | * | 3/1924 | Spencer ................. F16K 47/00 137/515 |

(Continued)

OTHER PUBLICATIONS

Allen, Sean Michael; Non-Final Office Action for U.S. Appl. No. 17/473,542, filed Sep. 13, 2021, dated Sep. 27, 2022, 24 pgs.

(Continued)

*Primary Examiner* — Umashankar Venkatesan
(74) *Attorney, Agent, or Firm* — Taylor English Duma LLP

(57) ABSTRACT

A valve closure device for a check valve can include a first valve member configured to rotate from an open position to a closed position; a second valve member configured to rotate from an open position of the second valve member to a closed position of the second valve member; and a hydraulic dampener coupled to each of the first valve member and the second valve member in each of the open position and the closed position of each of the first valve member and the second valve member, the hydraulic dampener configured to resist rotation of the first valve member towards the closed position of the first valve member and the second valve member towards the closed position of the second valve member.

21 Claims, 11 Drawing Sheets

(56) References Cited

U.S. PATENT DOCUMENTS

| | | | |
|---|---|---|---|
| 2,054,561 A * | 9/1936 | Greenberg | F16K 15/03 |
| | | | 137/272 |
| 2,717,001 A | 9/1955 | Perrault | |
| 2,923,317 A | 2/1960 | McInerney | |
| 3,007,488 A | 11/1961 | Wheeler, Jr. | |
| 3,677,297 A | 7/1972 | Walton | |
| 3,831,429 A | 8/1974 | Kmiecik | |
| 4,005,732 A | 2/1977 | Buckner | |
| 4,079,751 A | 3/1978 | Partridge et al. | |
| 4,127,142 A * | 11/1978 | Snider | E03B 9/04 |
| | | | 137/551 |
| 4,230,148 A | 10/1980 | Ogle, Jr. | |
| 4,361,165 A | 11/1982 | Flory | |
| 4,596,263 A | 6/1986 | Snider | |
| 4,607,661 A * | 8/1986 | Wessels | F16K 15/036 |
| | | | 137/527 |
| 4,774,981 A | 10/1988 | Mizusawa | |
| 5,010,919 A | 4/1991 | Partridge | |
| 5,088,905 A | 2/1992 | Beagle | |
| 5,158,265 A | 10/1992 | Miyairi | |
| 5,301,709 A | 4/1994 | Gasaway | |
| 5,509,437 A | 4/1996 | Merrett | |
| 5,609,179 A | 3/1997 | Knapp | |
| 5,711,343 A | 1/1998 | Beckett | |
| 6,029,949 A | 2/2000 | Brown et al. | |
| 6,726,176 B2 | 4/2004 | Bauman | |
| 6,851,255 B2 | 2/2005 | Aitchison et al. | |
| 7,152,622 B2 | 12/2006 | Scaramucci et al. | |
| 8,991,415 B1 | 3/2015 | Luppino | |
| 9,347,573 B2 | 5/2016 | Feng et al. | |
| 9,353,878 B2 | 5/2016 | Plummer et al. | |
| 9,581,256 B2 * | 2/2017 | Barone | F16K 15/038 |
| 9,890,866 B2 * | 2/2018 | Kitchen | E03B 9/04 |
| 10,228,070 B2 | 3/2019 | Minta | |
| 10,407,882 B2 | 9/2019 | Kitchen et al. | |
| 10,539,244 B2 * | 1/2020 | Solarz | F16K 27/0209 |
| 10,578,224 B2 * | 3/2020 | Reszewicz | F16K 15/038 |
| 10,612,690 B2 * | 4/2020 | Lesniewski | F16K 15/038 |
| 11,156,303 B2 * | 10/2021 | Allen | F16K 15/038 |
| 11,204,102 B2 | 12/2021 | Allen et al. | |
| 11,635,150 B2 | 4/2023 | Allen et al. | |
| 11,644,113 B2 | 5/2023 | Allen et al. | |
| 2005/0224114 A1 | 10/2005 | Cook et al. | |
| 2007/0044847 A1 | 3/2007 | Yang | |
| 2007/0256740 A1 | 11/2007 | Sugai et al. | |
| 2008/0072973 A1 * | 3/2008 | McGonigle | B64D 13/02 |
| | | | 137/512.1 |
| 2008/0078459 A1 * | 4/2008 | Warriner | F16K 15/038 |
| | | | 137/512.1 |
| 2008/0135100 A1 | 6/2008 | Davidson et al. | |
| 2015/0240962 A1 | 8/2015 | Plummer | |
| 2016/0265197 A1 | 9/2016 | Kitchen et al. | |
| 2017/0268696 A1 | 9/2017 | Esniewski | |
| 2018/0171606 A1 | 6/2018 | Kitchen | |
| 2020/0378508 A1 | 12/2020 | Allen et al. | |
| 2021/0293340 A1 | 9/2021 | Allen et al. | |
| 2021/0404567 A1 | 12/2021 | Allen et al. | |
| 2022/0074512 A1 | 3/2022 | Allen et al. | |
| 2023/0167913 A1 | 6/2023 | Allen et al. | |

OTHER PUBLICATIONS

Allen, Sean Michael; Non-Final Office Action for U.S. Appl. No. 17/526,630, filed Nov. 15, 2021, dated Aug. 1, 2022, 25 pgs.

Allen, Sean Michael; Corrected Notice of Allowance for U.S. Appl. No. 16/428,742, filed May 31, 2019, dated Aug. 31, 2021, 4 pgs.

Allen, Sean Michael; Corrected Notice of Allowance for U.S. Appl. No. 16/428,742, filed May 31, 2019, dated Sep. 20, 2021, 6 pgs.

Allen, Sean Michael; Corrected Notice of Allowance for U.S. Appl. No. 16/428,742, filed May 31, 2019, dated Sep. 24, 2021, 2 pgs.

Allen, Sean Michael; Supplemental Notice of Allowance for U.S. Appl. No. 16/824,147, filed Mar. 19, 2020, dated Sep. 2, 2021, 6 pgs.

Allen, Sean Michael; Non-Final Office Action for U.S. Appl. No. 16/428,742, filed May 31, 2019, dated Feb. 19, 2021, 25 pgs.

Allen, Sean Michael; Notice of Allowance for U.S. Appl. No. 16/428,742, filed May 31, 2019, dated Jun. 14, 2021, 11 pgs.

Clow Valve Co.; Images of Clow Valve, publicly available prior to May 31, 2019, 3 pgs.

Mueller; Brochure for Jones Tell-Tale Break-Off Check Valve, published Oct. 2018, 1 pg.

Mueller; Installation Instructions for J-5000 Break Check Valve, published Oct. 2018, 1 pg.

Allen, Sean Michael; Applicant-Initiated Interview Summary for U.S. Appl. No. 16/824,147, filed Mar. 19, 2020, dated Feb. 16, 2021, 8 pgs.

Allen, Sean Michael; Applicant-Initiated Interview Summary for U.S. Appl. No. 16/824,147, filed Mar. 19, 2020, dated Jul. 2, 2021, 7 pgs.

Allen, Sean Michael; Final Office Action for U.S. Appl. No. 16/824,147, filed Mar. 19, 2020, dated May 18, 2021, 19 pgs.

Allen, Sean Michael; Non-Final Office Action for U.S. Appl. No. 16/824,147, filed Mar. 19, 2020, dated Jan. 21, 2021, 20 pgs.

Allen, Sean Michael; Notice of Allowance for U.S. Appl. No. 16/824,147, filed Mar. 19, 2020, dated Aug. 16, 2021, 7 pgs.

Mueller; Brochure for J6000 Series Break Check, Copyright 2019, 2 pgs.

Clow Valve Co.; Brochure for LP619 Break-Off Checkvalve, publicly available by Aug. 27, 2019, 2 pgs.

Clow Valve Company; Specification Sheet for LP619 Low Profile Break Off Check Valve, publicly available by Aug. 27, 2019, 1 pg.

Allen, Sean Michael; Notice of Allowance for U.S. Appl. No. 17/473,542, filed Sep. 13, 2021, dated Jan. 27, 2023, 13 pgs.

Allen, Sean Michael; Applicant-Initiated Interview Summary for U.S. Appl. No. 17/473,542, filed Sep. 13, 2021, dated Nov. 17, 2022, 3 pgs.

Allen, Sean Michael; Notice of Allowance for U.S. Appl. No. 17/526,630, filed Nov. 15, 2021, dated Nov. 1, 2022, 7 pgs.

Allen, Sean Michael; Non-Final Office Action for U.S. Appl. No. 18/102,466, filed Jan. 27, 2023, dated Jun. 4, 2023, 27 pgs.

* cited by examiner

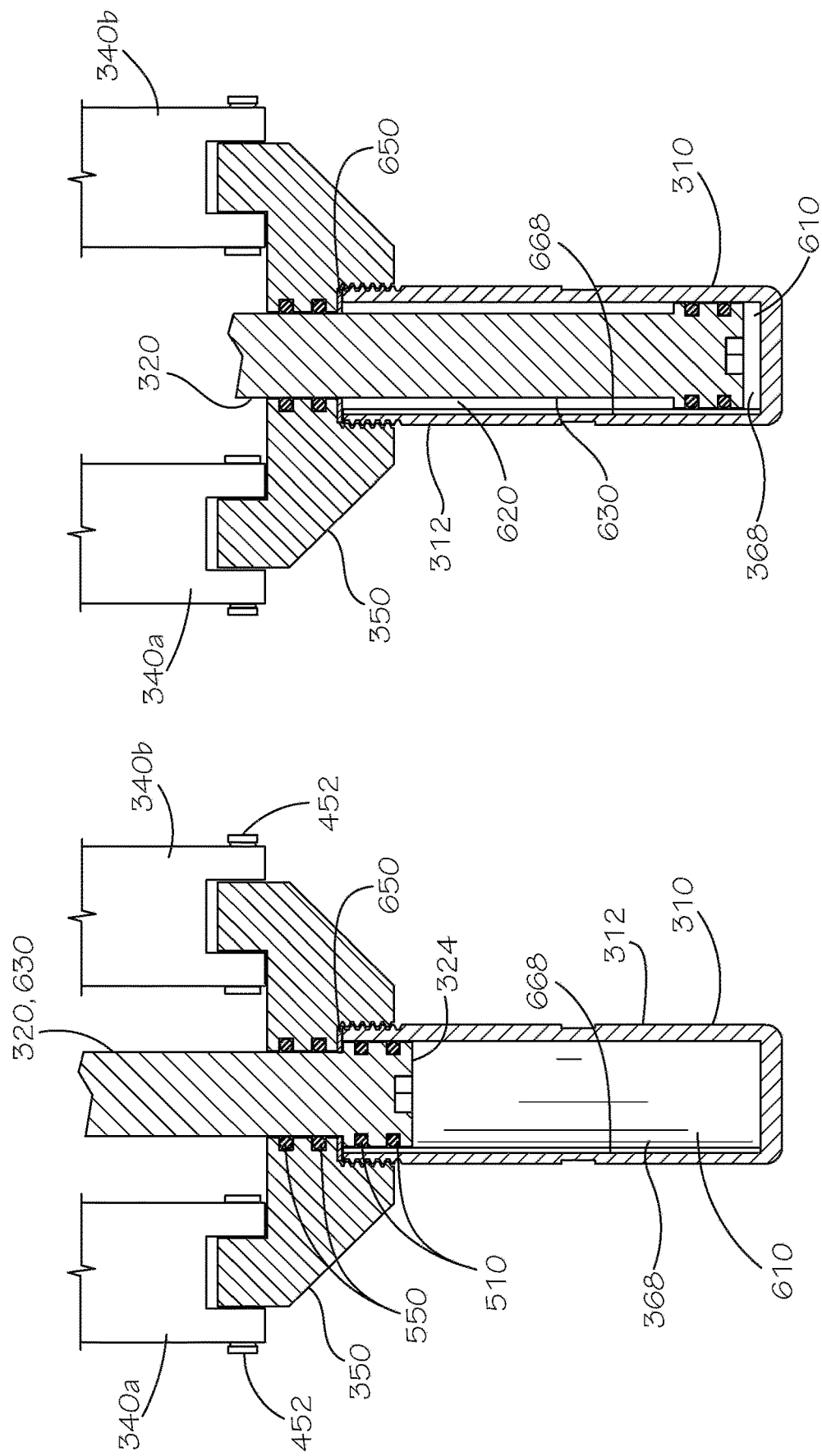

LOW WATER HAMMER BREAK CHECK VALVE

TECHNICAL FIELD

Field of Use

This disclosure relates to break check valves in a fluid distribution system. More specifically, this disclosure relates to break check valves comprising a hydraulic dampener.

Related Art

Property damage and water loss can occur when a pipe system fitting or, more specifically, a pipe system termination fitting such as a hydrant—in particular a wet barrel fire hydrant—that terminates a specific branch of a fluid distribution system is hit by a moving vehicle or otherwise broken free from its usual position in a water distribution system. Sudden stoppage of flow in such a fluid distribution system—at the aforementioned pipe fitting or elsewhere—can also result in damage to the system. While an in-line break check valve configured for use with a hydrant could mitigate such property damage and water loss, such valves can result in water hammer if they close too quickly. Such a valve can be considered a break check valve in the sense that it "checks" movement of the fluid when the pipe system fitting is broken away from the valve but not in the sense that it necessarily prevents backward flow of liquid. Moreover, overly rapid closure of such valves can cause not only water hammer but also a pressure spike resulting in an excessive load on the components of the system sufficient in some cases to cause a failure of one or more of those components.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a valve closure device for a break check valve, the device comprising: a first valve member configured to rotate from an open position to a closed position; a second valve member configured to rotate from an open position of the second valve member to a closed position of the second valve member; and a hydraulic dampener coupled to each of the first valve member and the second valve member in each of the open position and the closed position of each of the first valve member and the second valve member, the hydraulic dampener configured to resist rotation of the first valve member towards the closed position of the first valve member and the second valve member towards the closed position of the second valve member.

In a further aspect, disclosed is a system comprising: a break check valve comprising: a valve body defining a mating surface and a valve bore, the valve bore extending from a first axial end to a second axial end; a first valve member positioned within the valve body and configured to rotate from an open position to a closed position; a second valve member positioned within the valve body and configured to rotate from an open position of the second valve member to a closed position of the second valve member; and a hydraulic dampener coupled to each of the valve body, the first valve member, and the second valve member, the hydraulic dampener configured to resist rotation of each of the first valve member and the second valve member during closure of the break check valve; and a pipe system fitting coupled to the mating surface of the break check valve, the break check valve configured to close upon dislocation of the pipe system fitting from the break check valve.

In yet another aspect, disclosed is a method of using a break check valve, the method comprising: initiating closure of the break check valve upon dislocation of a pipe system fitting from the break check valve by rotation of each of a first valve member and a second valve member as a result of fluid pressure against each of the first valve member and the second valve member, the break check valve comprising: a valve body defining a mating surface and a valve bore, the valve bore extending from a first axial end to a second axial end; the first valve member positioned within the valve body; the second valve member positioned within the valve body; and a hydraulic dampener coupled to each of the valve body, the first valve member, and the second valve member; and dampening closure of each of a first valve member and a second valve member of the break check valve during closure of the break check valve with the hydraulic dampener.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 6A is a sectional detail view of the valve closure device of FIG. 2A taken along line 6A-6A of FIG. 2A in accordance with another aspect of the current disclosure.

FIG. 6B is a sectional detail view of the valve closure device of FIG. 6A taken along line 6B-6B of FIG. 2B.

DETAILED DESCRIPTION

Figure 1:
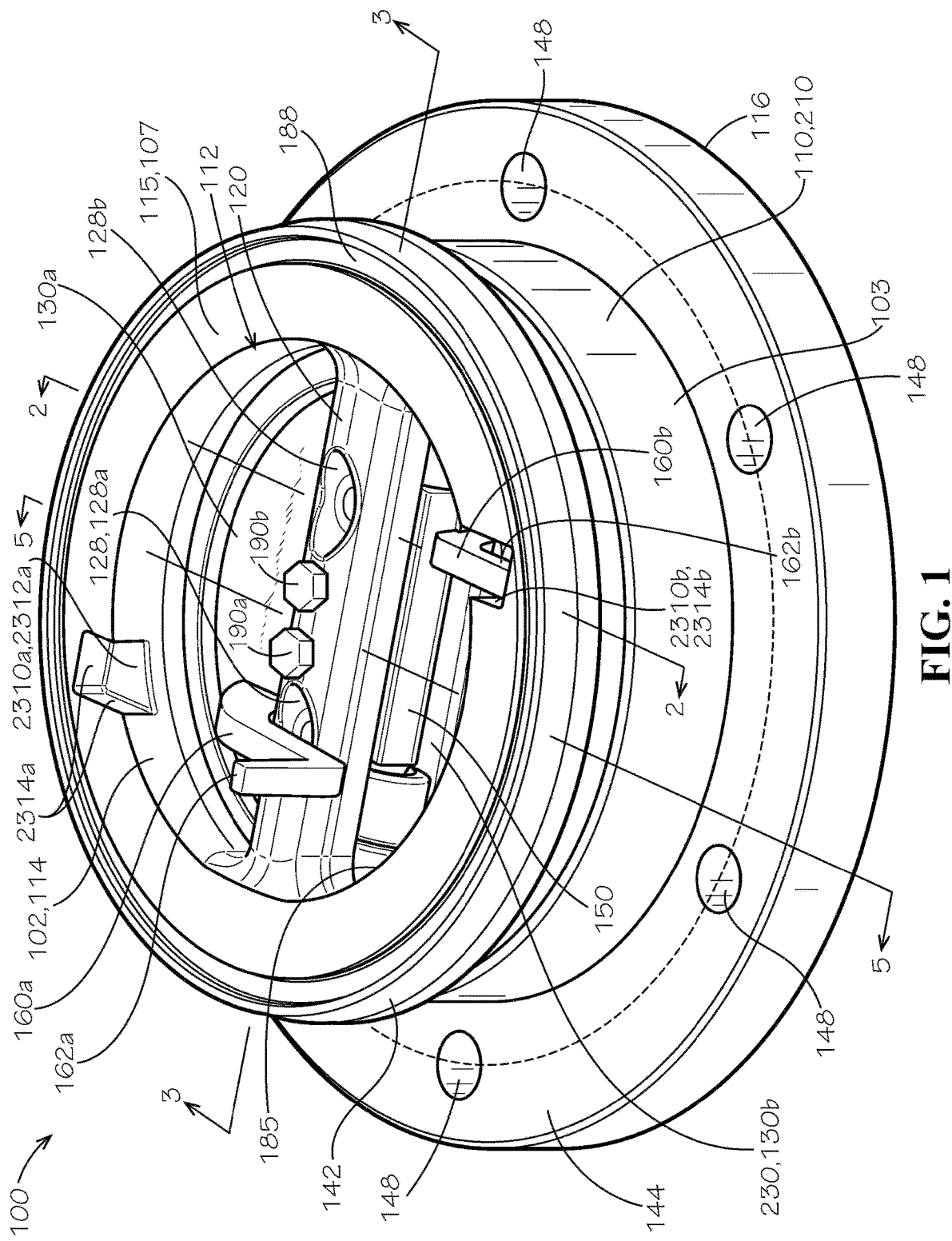
FIG. 1 is a perspective view of a break check valve in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a break check valve nearest to an outlet of the valve, and "rear" is that end of the break check valve that is opposite or distal the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a break check valve and associated methods, systems, devices, and various apparatuses are disclosed herein. In one aspect, the break check valve or a valve closure device thereof can comprise a hydraulic dampener.

Break check valves such as those typically used with wet barrel hydrants can suffer from excessive water hammer upon activation, which can adversely affect aging infrastructure.

Efforts have been made to reduce water hammer or its effects, but the effects remain. Because closing even a dry barrel hydrant too quickly can also cause water hammer, one solution in the industry is to simply close the hydrant very slowly. The break check valve disclosed herein imitates that slow closure and thereby can reduce or eliminate the water hammer.

Figure 2A:
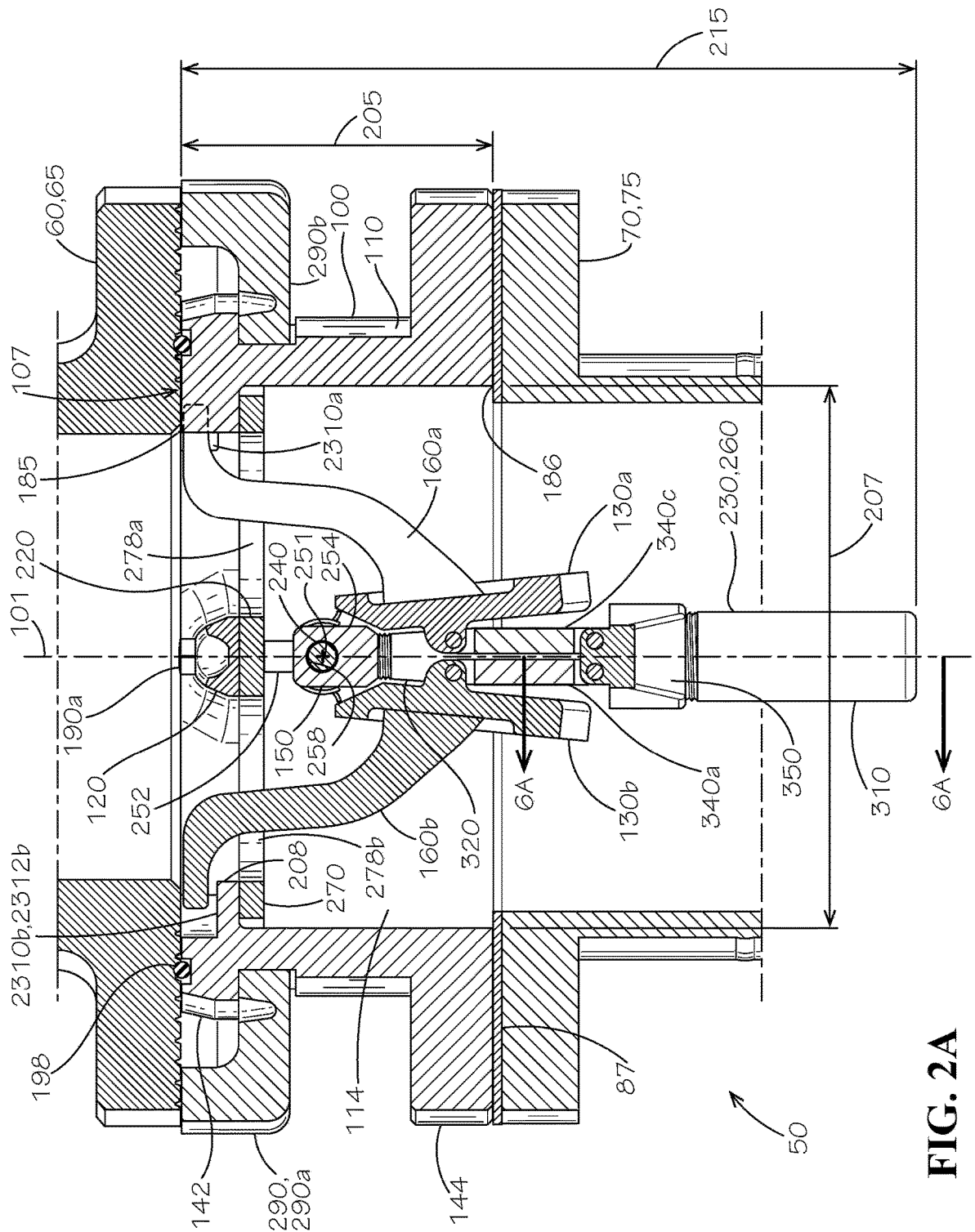
FIG. 2A is a sectional view of a system comprising the break check valve of FIG. 1 taken along line 2-2 of FIG. 1, the break check valve comprising a valve closure device and the system further comprising each of a pipe fitting and a hydrant to which the break check valve is assembled.
Figure 7A:
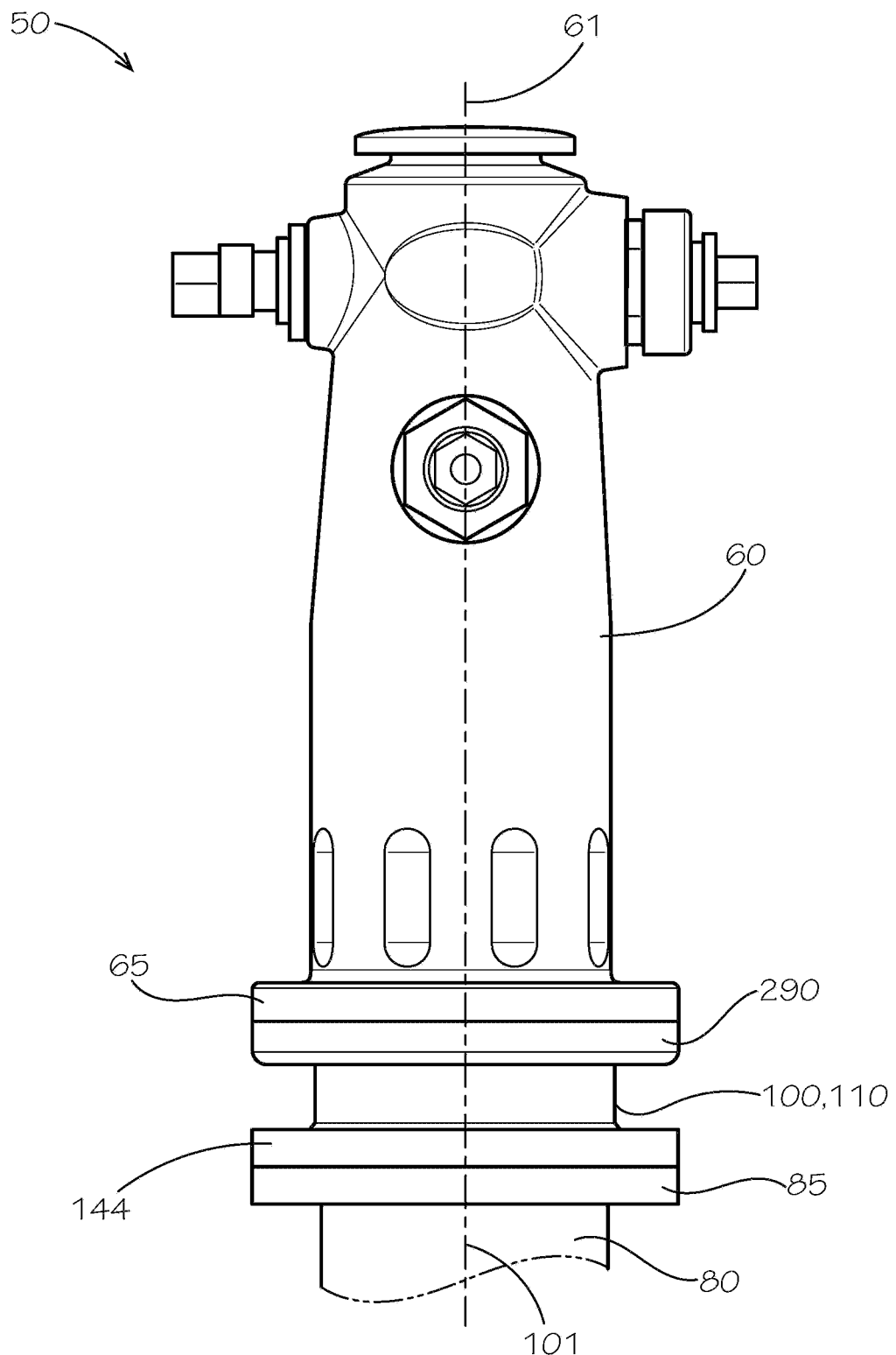
FIG. 7A is a side elevation view of the system of FIG. 2A showing the full hydrant.

FIG. 8 is a top perspective view of a check valve or, more specifically, a break check valve 100 in accordance with one aspect of the current disclosure. As shown, the break check valve 100 can comprise a valve body 110 defining a first axial end 115 and a second axial end 116. The valve body 110 and, more specifically, the first axial end 115, can further define a mating surface 107. Either or both of the first axial end 115 and the second axial end 116 can define a phonographic finish or a concentric finish. More specifically, fine ridges (not shown) separated by fine grooves (not shown)

can be defined, respectively, in either or both of a first end surface defined by the first axial end 115 and a second end surface defined by the second axial end 116. As shown, the valve body 110 can define a top flange 142, which can receive and support a neighboring and mating pipe system fitting such as a fitting 60 (shown in FIG. 2A) of a system 50 (shown in FIG. 2A). The fitting 60 can be any fitting for a pipe system such as, for example and without limitation, a pipe system termination fitting such as a hydrant (as shown in FIGS. 2A and 7A). The valve body 110 can define a groove 188, which can be sized to receive a seal 198 (shown in FIG. 2A). The bottom flange 144 can define mounting holes 148, which can facilitate mounting of the break check valve 100 to a neighboring fitting of the system 50.

The break check valve 100 and, more specifically, the valve body 110 can define an axis 101 (shown in FIG. 2A), an inner surface 102, and an outer surface 103. The break check valve 100 and, more specifically, the valve body 110 can define a valve inner cavity 112 defining a valve bore 114, which can extend from the first axial end 115 to the second axial end 116 of the break check valve 100. The first axial end 115 can be a valve inlet in some aspects and a valve outlet in other aspects. Similarly, the second axial end 116 can be a valve outlet in some aspects and a valve inlet in other aspects. Similarly, As shown, the valve body 110 can extend unbroken (i.e., without any openings extending from the inner surface 102 to the outer surface 103) from the first axial end 115 to the second axial end 116 and can thereby form or define a watertight structure between the first axial end 115 and the second axial end 116. More specifically, the valve body 110 can define respective axial end openings 185,186 (186 shown in FIG. 2A) at only the first axial end 115 and the second axial end 116.

In contrast, in some aspects not shown here but shown in the U.S. Patent Publication No. 2020/0378508, published Dec. 3, 2020, which is hereby incorporated by reference in its entirety, a pivot pin 240 (shown in FIG. 2A) of the break check valve 100 can be inserted through holes defined in one or more sides of an annular body 210 of the valve body 110 and the hole(s) thereafter plugged. While this construction can be easier to manufacture, a potential leak path (or even multiple leak paths) between the valve inner cavity 112 and an exterior of the break check valve 100 can result. Even if a seal for such a leak path prevents leakage initially, failure of the seal can lead to leakage of the fluid of the fluid distribution system therefrom.

The valve body 110 can comprise the annular body 210 and a cross member 120. The cross member 120 can extend from one side of the annular body 210 to another side of the annular body 210 and can be recessed or offset from a first axial end 115 of the break check valve 100. In some aspects, as shown, the cross member 120 can be formed monolithically with the valve body 110. In other aspects, the cross member 120 can be formed separately from the valve body 110. The valve body 110 itself can be monolithic, i.e., it can be formed as a singular component that constitutes a single material without joints or seams and can remain so formed.

The cross member 120 can define a hole 128 extending through the cross member 120 from a top surface to a bottom surface of the cross member 120. As shown, the cross member 120 can define a plurality of holes 128a,b, a bore of each of which can be in fluid communication with each of the valve inner cavity 112 of the break check valve 100 and an inner cavity of the fitting 60. As shown, one or more of the holes 128a,b can define a chamfer or other edge treatment at an entrance to the holes 128a,b. As will be described below, the one or more holes 128a,b can allow a limited stream of water to be expelled from the break check valve 100 when the break check valve 100 is in the closed position to indicate closure of the break check valve 100 and a resulting need for attention and service by appropriate service personnel.

The break check valve 100 can comprise a position block 150, which can be sized and otherwise configured to receive the pivot pin 240, about which each of valve members 130a,b can rotate. The position block 150 can be secured to the valve body 110. The position block 150 can position and secure the pivot pin 240 and can do so independently from any other portion of the valve body 110. In some aspects, as shown, the position block 150 can be secured to the valve body 110 with one or more fasteners 190a,b. In other aspects, the position block 150 can be formed monolithically with the valve body 110 or a portion thereof. In some aspects, the position block 150 can be secured to the valve body 110 with another fastener such as an adhesive or a weldment, such as at an intersection between the position block 150 and the cross member 120. In some aspects, as shown, one or more of the fasteners 190a,b can extend through the pivot pin 240.

The break check valve 100 can comprise a valve closure device 230. The break check valve 100 and, more specifically, the valve closure device 230, can comprise one or more of the valve members 130a,b. Each of the valve members 130a,b can be positioned within the valve body 110 and can be configured to rotate from an open position (the position shown for the valve member 130b) of the valve member 130a,b to a closed position (the position shown for the valve member 130a) of the valve members 130a,b, which can correspond to an open position and a closed position, respectively, of the break check valve 100.

The break check valve 100 and, more specifically, the valve closure device 230, can comprise arms 160a,b, which can extend from each of the valve members 130a,b. Each of the arms 160a,b can be shaped to clear (i.e., not physically interfere or collide with) the cross member 120 whether the valve members 130a,b—and the break check valve 100 overall—are in the open position (the position shown for the arm 160b) or in the closed position (the position shown for the arm 160a) or somewhere in between. In some aspects, as shown, each of stop cavities 2310a,b can define a bottom 2312a,b (2312b shown in FIG. 2A) and a side wall 2314a,b and can be sized to receive a respective tip 162a,b of the respective arm 160a,b. In some aspects, the stop cavities 2310a,b and the mating surface 107 are not required—at least they need not be incorporated into the valve body 110 or even the break check valve 100, and fitting 60 of the system 50 can still be sufficiently secured to and supported by the break check valve 100.

Figure 2B:
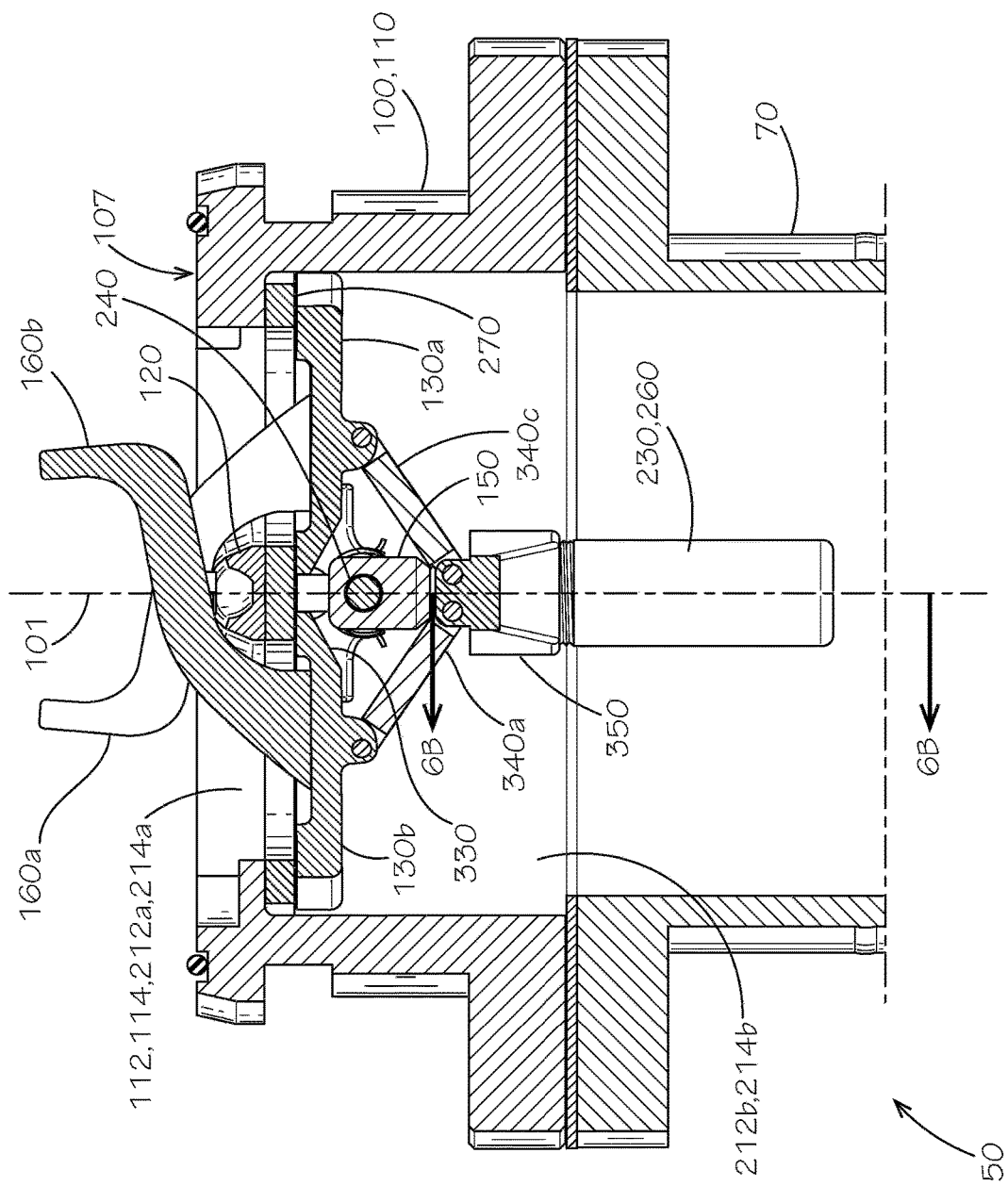
FIG. 2B is a sectional view of the system of FIG. 2A after dislocation of the hydrant of FIG. 2A and closure of the break check valve thereof.

FIGS. 2A and 2B are sectional views of the system 50 of FIG. 1 taken along line 2-2 of FIG. 1 before and after dislocation of the fitting 60 from the break check valve 100. FIG. 2A is specifically a sectional view of the system 50 comprising the break check valve 100 of FIG. 1 taken along line 2-2 of FIG. 1. As shown, the break check valve 100 can comprise the valve closure device 230, while the system 50 can further comprise each of a pipe fitting 70 and the fitting 60 to which the break check valve 100 can be assembled. A gasket or seal 87 can be positioned between the pipe fitting 70 and the break check valve 100. Again, as shown, the fitting 60 can be a pipe system termination fitting, which can be a hydrant. More specifically, the fitting 60 can be a wet barrel hydrant. As shown, the seal 198 can seal against leakage of fluid between the break check valve 100 and the fitting 60. The break check valve 100 can be configured to close upon dislocation (e.g., separation or removal) of the fitting 60 and, more specifically, the pipe system termination fitting from the break check valve 100, which can be by rotation of each of the first valve member 130*a* and the second valve member 130*b* to the respective closed positions.

As previously described, the valve members 130*a,b* can be positioned within the valve body 110 and can be configured to rotate about the pivot pin 240 from the open position shown to the closed position shown in FIG. 2B. The valve members 130*a,b* can be configured to remain in the open position as long as a surface of the fitting 60 remains in contact with the mating surface 107 of the valve body 110. In some aspects, the first arm 160*a* does not extend past the mating surface 107 of the valve body 110 when the first valve member 130*a* is in the open position, and the second arm 160*b* does not extend past the mating surface 107 of the valve body 110 when the second valve member 130*b* is in the open position. More specifically, the first arm 160*a* can also extend from the first valve member 130*a* but not past the mating surface 107 of the valve body 110 when the first valve member 130*a* is in the open position, and the second arm 160*b* can also extend from the second valve member 130*b* but not past the mating surface 107 of the valve body 110 when the second valve member 130*b* is in the open position. More specifically, the arms 160*a,b* can be secured to the respective valve members 130*a,b*. As shown, the break check valve 100 and, more specifically, the arms 160*a,b* can be held in the open position under a mounting flange 65 of the fitting 60 and, optionally, within the stop cavities 2310*a,b* of the valve body 110. As shown, the arms 160*a,b* can be positioned entirely within the valve body 110 such that the arms 160*a,b* do not extend past the mating surface 107 when the break check valve 100 is in the open position. The valve members 130*a,b* can be configured to close when the fitting 60 is separated from the valve body 110 and, more specifically, the mating surface 107 of the valve body 110. More specifically, arms 160*a,b* can be configured to move and by such movement allow the valve members 130*a,b* to move to the closed position when the fitting 60 is separated from the valve body 110.

The break check valve 100 can further comprise a seal 270, which can be positioned between the valve body 110 and the valve members 130*a,b* in the closed positions of the valve members 130*a,b* and the break check valve 100. The seal 270, which can be a shim or spacer, can be positioned along or aligned with the axis 101 of the break check valve 100 below an internal flange 208 and, additionally, between the internal flange 208 of the valve body 110 and the valve members 130*a,b*. The seal 270 can define a first or upper surface and a second or lower surface opposite from the upper surface. The seal 270 can define a thickness in an axial direction with respect to the axis 101, an outer diameter, and an inner diameter. The seal 270 can define openings 278*a,b*, which can extend from the upper surface to the lower surface of the seal 270 and can define the inner diameter of the seal 270. The inner diameter of the seal 270 can be substantially equal to at least an inner diameter of the valve body 110 proximate to or at the internal flange 208, and the outer diameter of the seal 270 can be less than or equal to an inner diameter 207 of the valve body 110 adjacent to the internal flange 208. The seal 270 can itself define a cross member 220. The seal 270 and, more specifically, the cross member 120 can define an opening 578 (shown in FIG. 5A), which can be sized to receive at least a base end or base portion 252 of the position block 150 and, at least in aspects in which the position block 150 is already secured to or formed from the valve body 110 can be sized to receive also a distal end or distal portion 254 of the position block 150.

In some aspects, the internal flange 208 can either not be present or can be cut away at a position of the arms 160*a,b* such that instead of the stop cavities 2310*a,b* there is no part of the valve body 110 directly supporting or even contacting the tips 162*a,b* of the respective arms 160*a,b*. A height of the side wall 2314*a,b* of each stop cavity 2310*a,b* or a distance from the bottom 2312*a,b* of each stop cavity 2310*a,b* to the mating surface 107 of the valve body 110 can be at least a thickness of the tip 162*a,b* of the arm 160*a,b*. In some aspects, as shown, a lateral position of the arms 160*a,b* can be aligned with a lateral position of the holes 128*a,b* defined in the cross member 120. When the break check valve 100 actuates and the valve members 130*a,b* close, the fluid shooting or passing through the holes 128*a,b* and against the arms 160*a,b* can push on the arms 160*a,b* and particularly the tips 162*a,b* of the respective arms 160*a,b* to resist closure or dampen closure of the valve members 130*a,b*. This effect can be increased as the break check valve 100 closes and a speed of the fluid flow through the holes 128*a,b* increases such that as the break check valve 100 closes it decelerates.

The seal 270 can comprise a soft, elastic material that when contacted by the valve members 130*a,b* will compress and thereby dampen any pressure spike in the system 50 upon closure of the break check valve 100. In some aspects, the seal 270 can comprise any elastomer or elastomeric material such as, for example and without limitation, Buna-N rubber, EPDM rubber, natural rubber, or silicone. In some aspects, the seal 270 can comprise another compressible material. In various aspects, as will be described, the seal 270 can be used in combination with another dampener.

In some aspects, as shown, an axial length 205 of a portion of the valve body 110 as it extends between the fitting 60 and the pipe fitting 70 can be less than or equal to an overall height or overall axial length 215 of the break check valve 100. The pivot pin 240 can be received within a pivot bore 258, which can be defined in the position block 150 and can define a pivot axis 251. Each of the pivot pin 240 and the valve members 130*a,b* can be aligned and assembled along the pivot axis 251.

The position block 150 can comprise the base portion 252 proximate to the valve body 110 and, more specifically, the cross member 120 in an assembled position of the position block 150. The position block 150 can comprise the distal portion 254.

The break check valve 100 and, more specifically, the valve closure device 230 can comprise a hydraulic dampener 260. The hydraulic dampener 260 can be fixably secured to the valve body 110 and, more specifically, the position block 150. The hydraulic dampener 260 can be coupled to each of the valve body 110, the first valve member 130*a*, and the second valve member 130*b*. The hydraulic dampener 260 can be configured to resist rotation or dampen closure of each of the first valve member 130*a* and the second valve member 130*b* during closure of the break check valve 100. More specifically, the hydraulic dampener 260 can be configured to resist rotation or dampen closure of the first valve member 130*a* towards the closed position of the first valve member 130*a* and the second valve member 130*b* towards the closed position of the second valve member 130*b*. While "hydraulic" can more narrowly be associated with systems and devices configured for use with or, more broadly, related to water as a fluid, "hydraulic" as disclosed herein can involve the use of any fluid and, more specifically, any liquid including but not limited to water.

The hydraulic dampener 260 can comprise a cylinder 310 and a piston 320, which can be slidably coupled to and positioned at least partially within the cylinder 310. The hydraulic dampener 260 can be coupled to each of the first valve member 130a and the second valve member 130b. More specifically, the hydraulic dampener 260 can be coupled to each of the first valve member 130a and the second valve member 130b in each of the open position and the closed position of each of the first valve member and the second valve member. In some aspects, one of the piston 320 and the cylinder 310 can be coupled to the valve body 110, and another of the piston 320 and the cylinder 310 can be coupled to each of the first valve member 130a and the second valve member 130b. An axis of each of the piston 320 and the cylinder 310 can be aligned with the axis 101 of the valve bore 114.

In some aspects, as shown, the cylinder 310 can be coupled to the first valve member 130a with a first linkage member 340a and can be coupled to the second valve member 130b with a second linkage member 340c. More specifically, including in such aspects, the piston 320 can be coupled to and fixably secured to the valve body 110. In other aspects, the piston 320 can be coupled to the first valve member 130 with the first linkage member 340a and can be coupled to the second valve member 130b with the second linkage member 340c. More specifically, including in such aspects, the cylinder 310 can be coupled to and fixably secured to the valve body 110. The hydraulic dampener 260 can further comprise a cylinder block 350, and the cylinder 310 can be secured to the cylinder block 350. In other aspects, the positions of the cylinder 310 and the piston 320 can be reversed such that the cylinder 310 is stationary and the piston 320 moves. More specifically, the piston 320 can be coupled to the valve members 130a,b via linkage members such as the linkage members 340a,b,c,d, albeit lengthened as desired to accommodate a desired stroke of the hydraulic dampener 260 and to allow a diameter of the cylinder 310 to not interfere with the valve members 130a,b. In some aspects, a height of the position block 150 in the axial direction (i.e., along the axis 101) can be increased.

The fitting 60 can be secured to the top flange 142 of the break check valve 100 with a frangible connection such as, for example and without limitation, a traffic flange 290. The traffic flange 290, which can comprise one or more separate traffic flange portions 290a,b to facilitate assembly of the traffic flange 290 to the break check valve 100 and the fitting 60, can be secured to the fitting 60 with fasteners (not shown) such as, for example, through-bolts configured to extend through mounting holes (not shown) defined in each of the traffic flange 290 and the mounting flange 65 of the fitting 60. The break check valve 100, and specifically the bottom flange 144 thereof, can itself be secured to mounting holes (not shown) defined in a flange 75 of the pipe fitting 70. The fitting 60 can be configured to couple to and be in fluid communication with these and other portions of the system 50.

Even while still at least partially assembled to the mounting flange 65 of the fitting 60, the traffic flange 290 can be configured to fail before other components of the system 50 and permit complete dislocation of the fitting 60 from the system 50 upon impact to the fitting 60 by an object such as a moving vehicle (for example, when the fitting 60 is run over and knocked off by the vehicle). Because the traffic flange 290 is frangible, the break check valve 100 itself and other components of the system 50 need not be frangible themselves. Dislocation of the fitting 60, which can result from the aforementioned impact by the moving vehicle but can also result from other circumstances, could cause significant fluid loss were it not for immediate actuation or closure of the break check valve 100. Without the break check valve 100, this fluid loss is possible because the fitting 60, at least when it is a wet barrel hydrant, is typically filled or pressurized with a fluid such as water.

FIG. 2B is specifically a sectional view of the system 50 of FIG. 2A after dislocation of the fitting 60 (shown in FIG. 2) and subsequent closure of the break check valve 100. As shown, a portion of the valve inner cavity 112 and the valve bore 114 can be on either side of the valve members 130a,b. More specifically, first portions 212a,214a of the valve inner cavity 112 and the valve bore 114, respectively, can be defined between the first axial end 115 and the valve members 130a,b; and second portions 212b,214b of the valve inner cavity 112 and the valve bore 114, respectively, can be defined between the second axial end 166 and the valve members 130a,b. As shown, upon dislocation and, as shown, complete separation of the fitting 60 from the break check valve 100, the arms 160a,b can be free to move and the valve members 130a,b can also be free to move into a closed position. More specifically, each of the first arm 160a and the second arm 160b can extend past the mating surface 107 of the valve body 110 with the respective valve members 130a,b in the respective closed positions. In some aspects, the arms 160a,b can be separate from the valve members 130a,b and can detach from the break check valve 100 upon dislocation of the fitting 60. The valve members 130a,b can define a chamfer or edge treatment 335 at an inboard edge proximate to the pivot pin 240.

Figure 3:
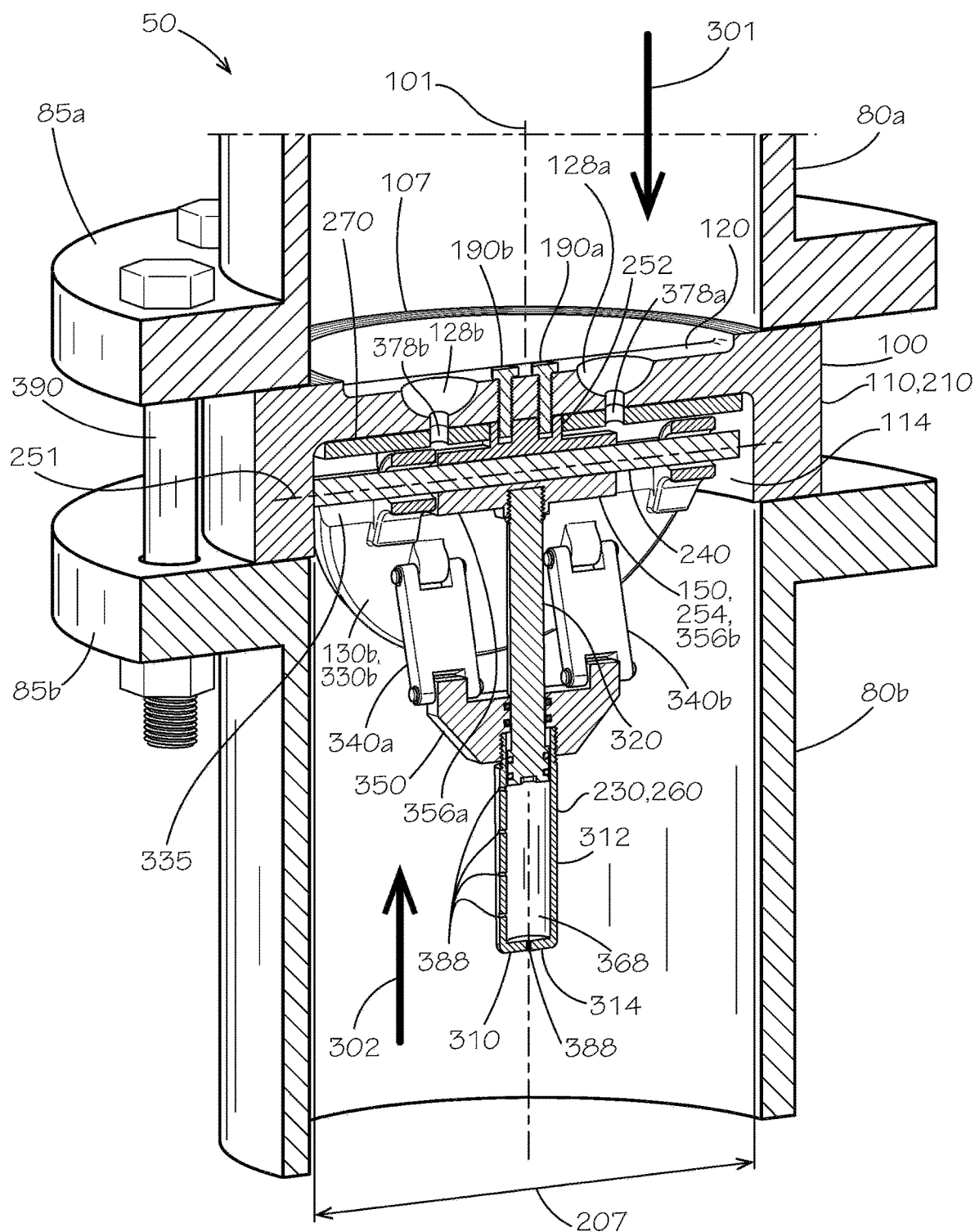
FIG. 3 is a sectional perspective view of a system comprising the break check valve of FIG. 1 taken along line 3-3 of FIG. 1 in accordance with another aspect of the current disclosure.

FIG. 3 is a sectional perspective view of the system 50 comprising the break check valve 100 of FIG. 1 taken along line 2-2 of FIG. 1 in accordance with another aspect of the current disclosure. Shown in an open position, the break check valve 100 can positioned between two fittings 80a,b and secured to each. More specifically, the fittings 80a,b can be configured to be secured to each other with fasteners 390, which are nuts and bolts in the current aspect, and with the break check valve 100 therebetween, and neither of the fittings 80a,b need be configured to separate from the break check valve 100 upon impact. In fact, the system 50 can be buried or otherwise positioned in a protected location such that the break check valve 100 primarily functions to prevent backflow in the system 50 and not necessarily to close upon damage to the system, although such functionality can be present, as described above. As shown, the system 50 can define a positive flow direction 301 and a negative flow direction 302, which can be a backflow or reverse flow direction. In some aspects, as shown, a portion of the system 50 comprising the break check valve 100 can be oriented vertically. In other aspects, the portion of the system 50 comprising the break check valve 100 need not be oriented vertically.

In some aspects, as shown, a length of the pivot pin 240 can be less than or equal to the inner diameter 207 of the valve bore 114 at an axial position of the pivot pin 240 relative to the axis 101 of the break check valve 100. More specifically, the valve body 110 and the pivot pin 240 can define a gap therebetween to facilitate free or unrestricted rotation of the valve members 130a,b. In some aspects, as shown, an entirety of the pivot pin 240 can be positioned within the valve bore 114. In other aspects, the length of the pivot pin 240 can be greater than or equal to the inner diameter 207 and the pivot pin 240 can still not extend completely through the annular body 210 of the valve body 110 so as to require an opening in the outer surface 103 of the valve body 110.

The valve members 130a,b can be configured to remain in the open position of the valve member 130a,b and in the open position of the break check valve 100 as long as a fluid in the fluid distribution system 50 is moving in the positive flow direction 301 of the break check valve 100. The valve members 130a,b and the break check valve 100 can be configured to close when the fluid is moving in the negative flow direction 302 of the break check valve 100 or when the fluid is not moving through the break check valve 100 at all. As shown, a first side of each of the valve members 130a,b—such as a first side 330b of the valve member 130b—can be at least partially facing away from the direction of flow of fluid through the break check valve 100 such that flow of the fluid in the system 50 in the negative flow direction 302, i.e., against the first side 330b, will naturally rotate the valve members 130a,b towards the closed position. As shown, in an open position of the valve members 130a,b each can be angled with respect to the axis 101 towards the closed position instead of, for example, being aligned with the axis 101, to facilitate closing of the valve members 130a,b.

In some aspects, a biasing element (not shown) can maintain a position of each of the corresponding valve members 130a,b in the aforementioned open position until flow of the fluid through the system 50 reverses and causes closure of the break check valve 100. For example and without limitation, the biasing elements can be torsion springs encircling or surrounding portions of the position block 150 and can thereby be fixed in relative position with respect to the position block 150. Any of the aforementioned biasing elements or other structures disclosed herein can be constructed and used as shown in U.S. patent application Ser. No. 16/824,147, filed Mar. 19, 2020, which is hereby incorporated by reference in its entirety. The break check valve 100 can further comprise the seal 270. As shown, the break check valve 100 can be wafer valve, which need not comprise its own mounting flanges but can instead be positioned, installed, and sandwiched between flanges 85a,b of the respective pipe fittings 80a,b. More specifically, an outer diameter of the valve body 110 can be larger than an inner diameter of the corresponding pipe fitting 80a,b and can thereby be contacted and captured by axial ends of the pipe fittings 80a,b.

The pipe fittings 80a,b can be any one of a variety of components of the system 50 such as, for example and without limitation, an extension barrel, a hydrant shoe, or, as shown, simply a pipe of some length of pipe adequate to connect to another portion of the system 50. The pipe fittings 80a,b can comprise the flanges 85a,b, which can be mounting flanges and can define mounting holes extending therethrough. The fasteners 90 can extend, for example and without limitation, through the mounting holes. A seal (not shown) can be positioned between each of the pipe fittings 80a,b and the break check valve 100. In some aspects, the seal can comprise any elastomer or elastomeric material such as, for example and without limitation, Buna-N rubber (i.e., nitrile rubber or acrylonitrile butadiene rubber), ethylene propylene diene monomer (EPDM) rubber, natural rubber, or silicone.

As shown, the distal portion 254 of the position block 150 can comprise a pair of trunnions 356a,b, which can be on opposite ends of the position block 150, and the position block 150 can define a T-shape when viewed from a position angled with respect to the pivot axis 251. In some aspects, an overall length of the distal portion 254 of the position block 150 can be greater than a length of the base portion 252 of the position block 150. The position block 150 can define fastener bores, which can be sized to receive the fasteners 190a,b. As shown, the fasteners 190a,b can be bolts that define shafts, which can be threaded, and can comprise heads. The fasteners 190a,b can further comprise washers (not shown). The fasteners 190a,b can extend through openings defined in the cross member 120 and the seal 270.

As shown, openings 378a,b defined in the seal 270 and the holes 128a,b defined in the cross member 120 can be in fluid communication with each other and with each of the inner cavity of the fitting 60 and the inner cavity of a neighboring portion of the system 50 such as, for example and without limitation, the pipe fitting 80a. The openings 378a,b and the holes 128a,b can be separate from the valve bore 114 and in fluid communication with a portion of the valve inner cavity 112 on either side of the valve members 130a,b when in the closed position. More specifically, the openings 378a,b and the holes 128a,b can be in fluid communication with each of the portions 212a,b of the inner cavity 112 and the portions 214a,b of the inner bore 114. The holes 128a,b of the valve body 110 can be aligned with the openings 378a,b, respectively, so that together the openings 378a,b and the holes 128a,b can respectively facilitate such fluid communication.

In some aspects, as shown, the hydraulic dampener 260 can hold a fluid of the system 50 in an interior cavity 368 of the hydraulic dampener 260. More specifically, the hydraulic dampener 260 can allow passage of the fluid of the system 50 into and out of the interior cavity 368. In some aspects, as shown, the hydraulic dampener 260 can allow passage of the fluid of the system 50 into and out of the interior cavity 368 through openings 388, which can be defined in a wall of the cylinder 310. For example and without limitation, any one or more of openings 388 can be defined in a side wall 312 or in an end wall 314, or both. The fluid can be configured to resist rotation of each of the valve members 130a,b from the open position to the closed position by resisting movement of the cylinder 310 with respect to the piston 320. More specifically, in order for the cylinder 310 to move with respect to the piston 320 to allow closure of the valve members 130a,b, the openings 388 can be configured such that passage of the fluid from the interior cavity 368 is restricted, especially where the fluid is a noncompressible fluid such as water.

The piston 320 can be coupled to the position block 150. More specifically, a mounting end 322 (shown in FIG. 5A) of the piston 320 can be secured to a bore 358 (shown in FIG. 5A) defined in the distal portion 254 of the position block 150. A working end 324 (shown in FIG. 5A) of the piston 320 can extend through the cylinder block 350 and be received within the cylinder 310. In some aspects, as shown, the cylinder 310 can always filled with water because it is installed under a fitting 60 such as a wet barrel hydrant, which is typically always filled with water itself. In addition, in a wet barrel hydrant, the valve inner cavity 112 (shown in FIG. 1) can be in fluid communication with both the inner cavity of the fitting 80a—or the fitting 60 (shown in FIG. 2A)—and the inner cavity of the pipe fitting 80b, at least when the break check valve 100 is open or unactuated. In some aspects, the valve members 130a,b can be coupled to the cylinder block 350 with linkage members 340a,b and linkage members 340c,d (340c shown in FIG. 2A, 340d shown in FIG. 5B), respectively.

Figures 4A, 4B:
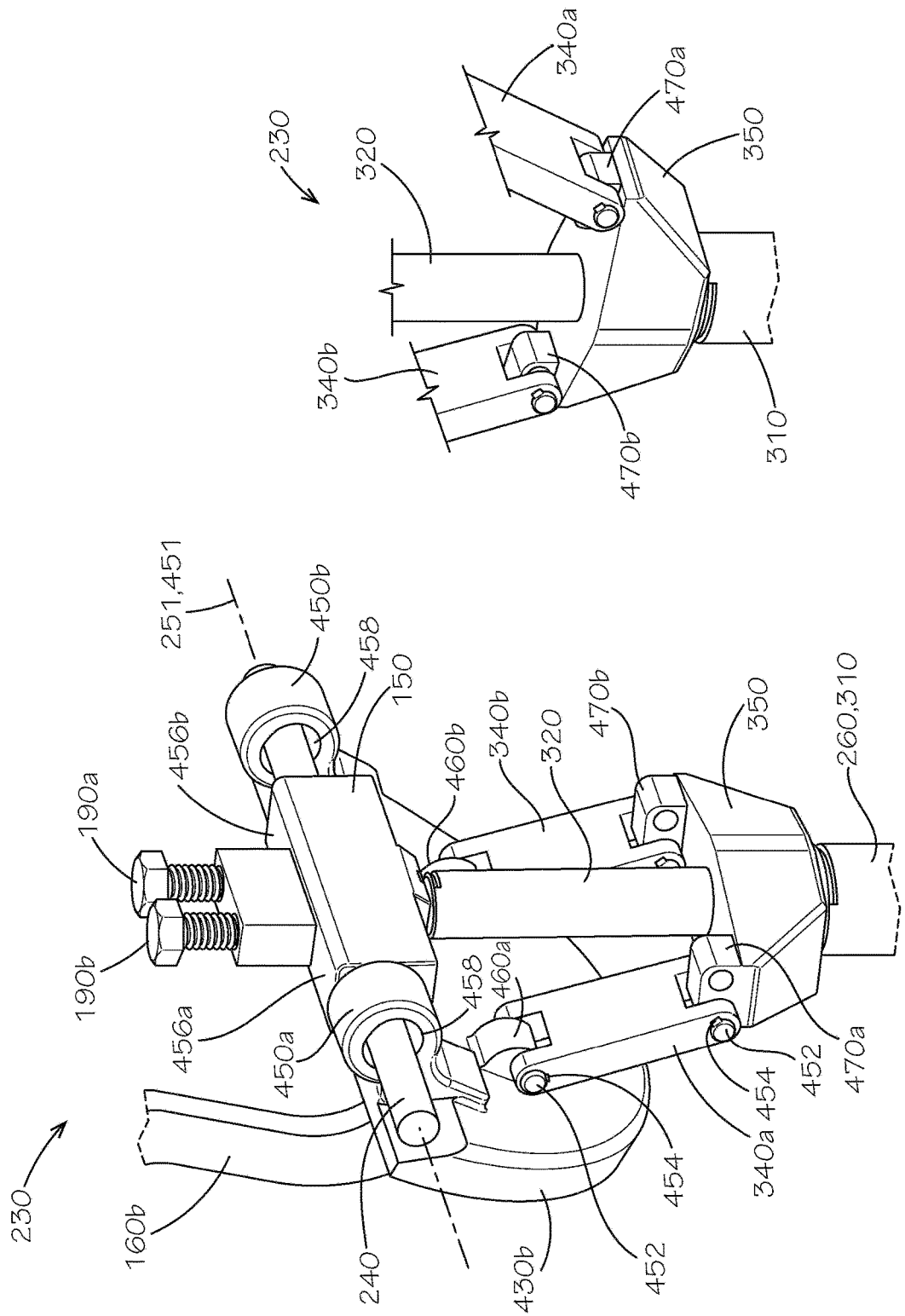
FIG. 4A is a perspective view of the valve closure device of FIG. 2A with one of a pair of valve members and two of four rigid members removed for clarity.
FIG. 4B is a perspective view of the valve closure device of FIG. 2A in accordance with another aspect of the current disclosure.

FIG. 4A is a perspective view of the valve closure device 230 of FIG. 2A with the valve member 130a and the linkage members 340c,d removed for clarity. As shown, the linkage members 340a,b,c,d can be coupled or joined to the respective valve members 130a,b and the cylinder block 350 using linkage fasteners 452 and retainers 454. For example and without limitation, the linkage fasteners 452 can be pins and the retainers 454 can be retaining rings. When the break check valve 100 is activated and the valve members 130a,b rotate towards a closed position, the connections between the valve members 130a,b and the cylinder 310 begin to pull or slide the cylinder 310 upwards over the piston 320.

The valve members 130a,b can nest together and can align along or with the pivot axis 251. Each of the valve members 130a,b and, more specifically, plates 430a,b (430a shown in FIG. 5A) can define a lug or a plurality of lugs 450a,b, each of which can define a pivot bore 458 defining a pivot bore axis such as a pivot bore axis 451 of the valve member 130b. In some aspects, the pivot bore 458 of each of the lugs 450a,b can be smooth and each of the valve members 130a,b can be configured to rotate about the and with respect to the pivot pin 240. In some aspects including the double disc configuration shown, each of the valve members 130a,b can comprise a half disc and can define a substantially semicircular shape. Each of the valve members 130a,b can comprise lugs 460a,b, through which the linkage fasteners 452 can secure the linkage members 340a,b to the respective valve members 130a,b. Similarly, the cylinder block 350 can comprise lugs such as lugs 470a,b, through which the linkage fasteners 452 can secure linkage members such as the linkage members 340a,b to the cylinder block 350. Each of the position block 150 and the piston 320 can comprise threading to facilitate a connection therebetween. Likewise, each of the cylinder block 350 and the cylinder 310 can comprise threading to facilitate a connection therebetween.

Figure 5A:
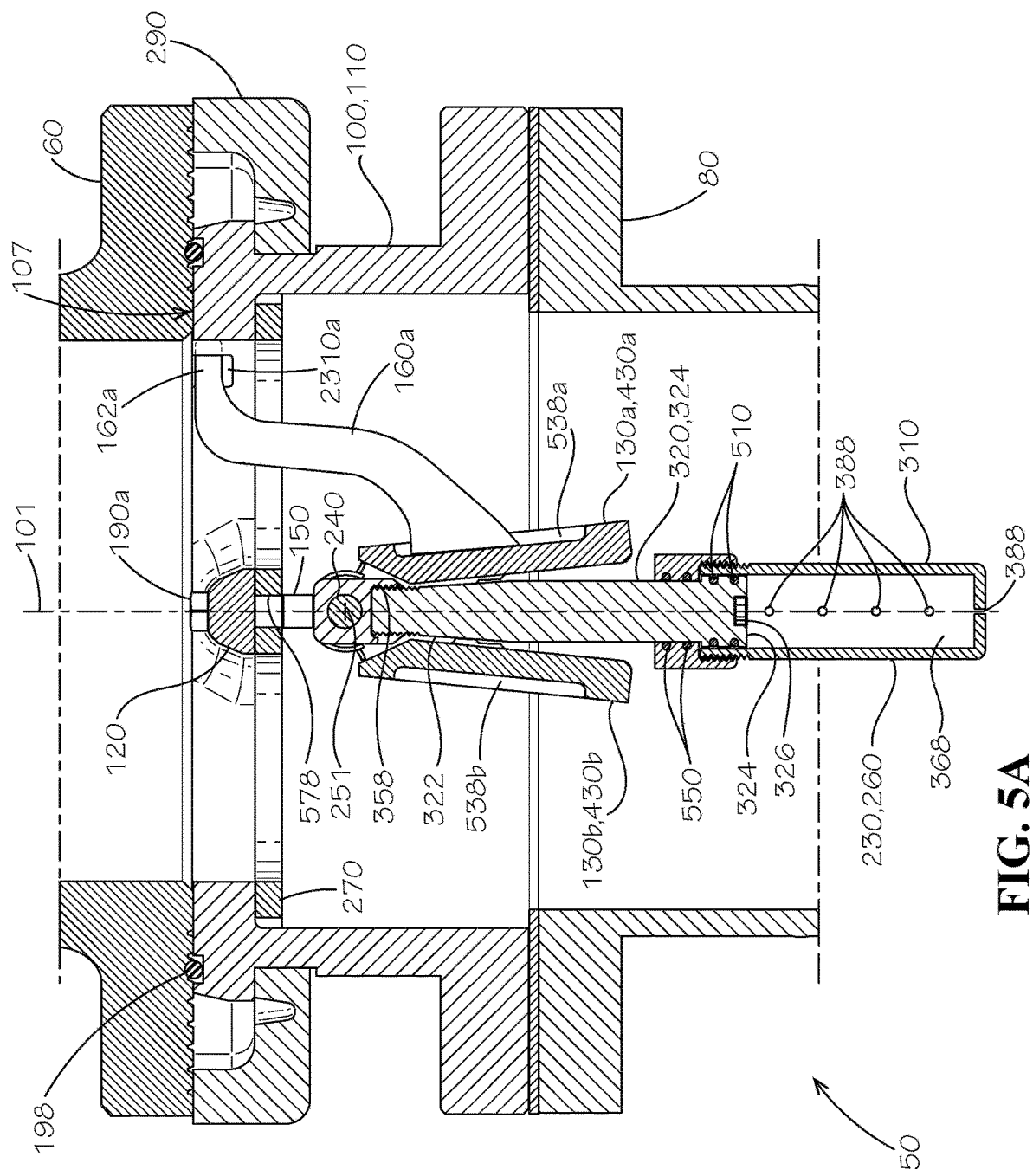
FIG. 5A is a sectional view of the system of FIG. 2A taken along line 5-5 of FIG. 1 before dislocation of the hydrant of FIG. 2A and with the break check valve of FIG. 1 in an open position.

FIG. 4B is a perspective view of the valve closure device 230 of FIG. 2A in accordance with another aspect of the current disclosure. As shown, the cylinder block 350 can comprise the lugs 470a,b, but instead of two linkage members 340a,b per valve member 130a,b (shown in FIG. 2A) only one linkage member 340a,b can be used per valve member 130a.b. In some aspects, as shown in FIG. 5A, using the two linkage members 340a,b per valve member 130a,b can permit the valve members 130a,b to open further in a fully open position and one or more surfaces of the 430a,b of the respective valve members 130a,b in the fully open position can more closely align with the axis 101. The linkage members 340a,b can be formed from a rigid material. The linkage members 340a,b can be formed into a shape such as, for example and without limitation, a bar or a wire. The linkage members 340a,b can hold and can be configured to hold the cylinder 310 in the desired position with respect to the piston 320 in the open position of the break check valve 100, in the closed position of the break check valve 100, and in each position therebetween.

Figure 5B:
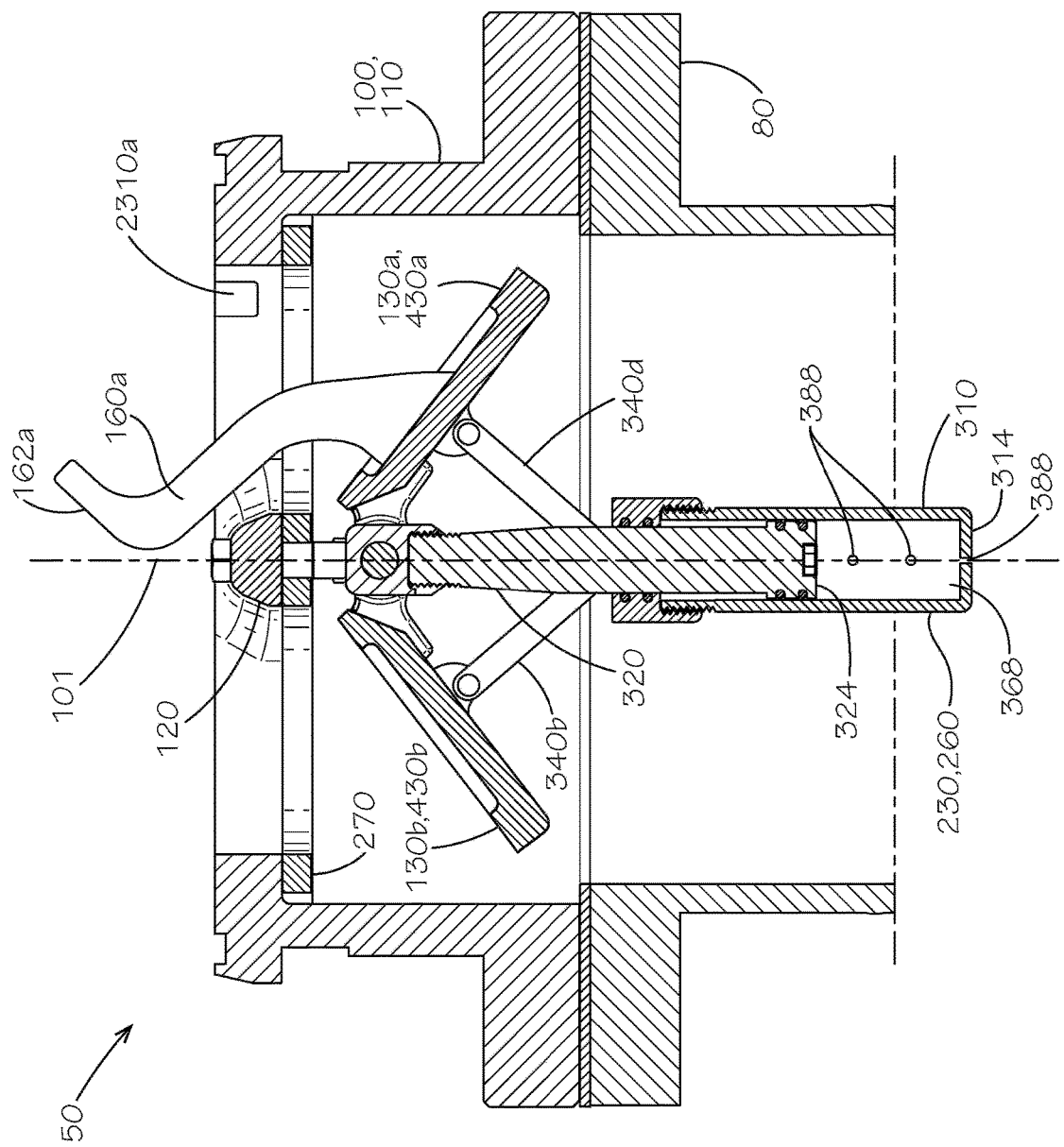
FIG. 5B is a sectional view of the system of FIG. 2A taken along line 5-5 of FIG. 1 after dislocation of the hydrant of FIG. 2A and during closure of the break check valve of FIG. 1.
Figure 5C:
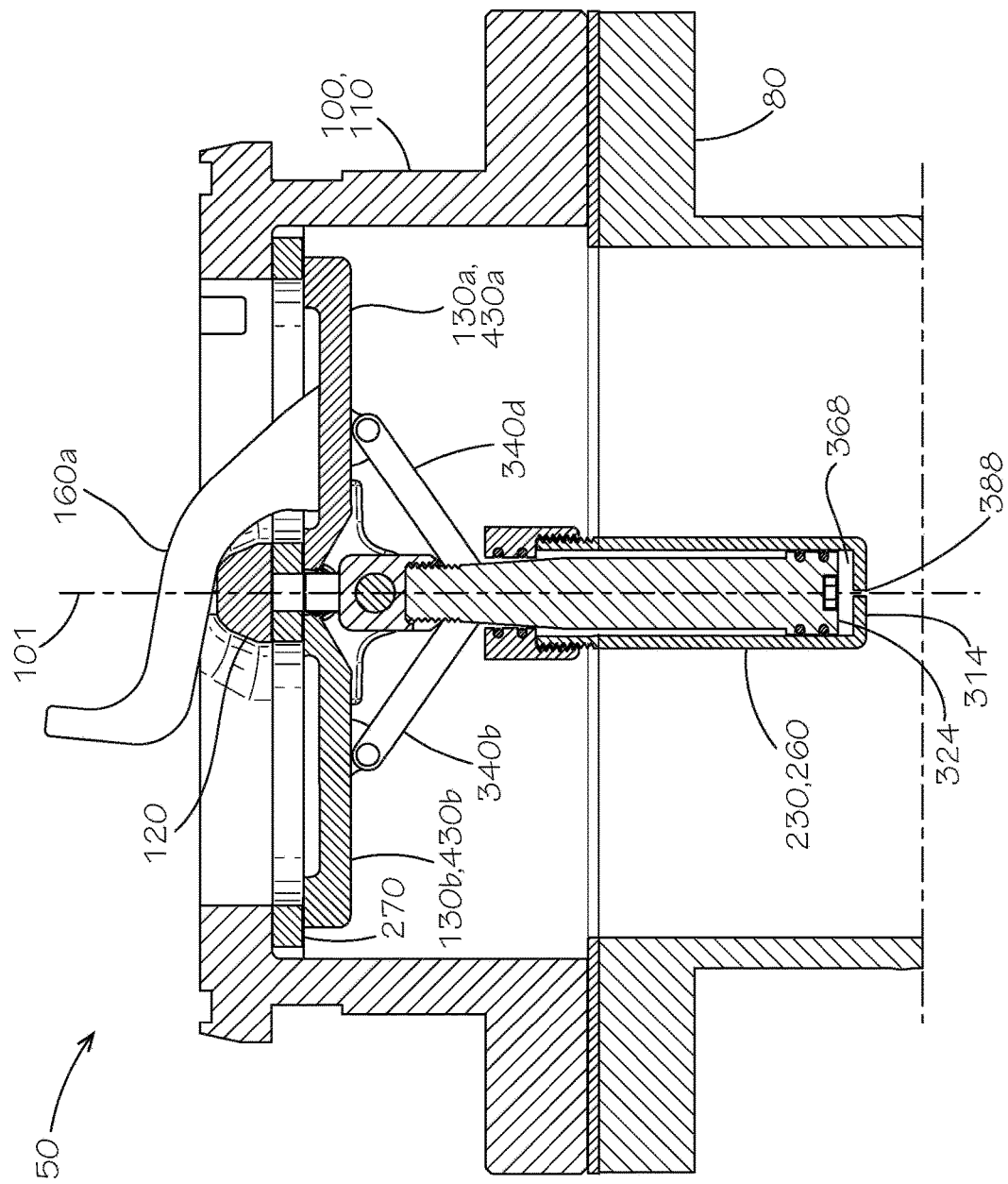
FIG. 5C is a sectional view of the system of FIG. 2A taken along line 5-5 of FIG. 1 after dislocation of the hydrant of FIG. 2A and with the break check valve of FIG. 1 in a closed position.

FIGS. 5A-5C are sectional views of the system 50 of FIG. 2A taken along line 5-5 of FIG. 1 before and after dislocation of the fitting 60 of FIG. 2A from the break check valve 100. FIG. 5A is specifically a sectional view of the system 50 before dislocation of the fitting 60 of FIG. 2A. The break check valve 100 and, more specifically, the valve members 130a,b are shown in the open position. Again, the position block 150 can be secured to the cross member 120 of the valve body 110. The piston 320 and, more specifically, the mounting end 322 thereof can be secured to the position block 150. In some aspects, a fastener recess 326 in the working end 324 of the piston 320 can facilitate rotation and tightening of the piston 320 with respect to the position block 150. The piston 320 and, more specifically, the working end 324 thereof can be slidably secured to either or both of the cylinder 310 and the cylinder block 350. One or more O-rings 550 can seal a joint between the piston 320 and the cylinder block 350 and thereby prevent passage of fluid therebetween. Similarly, one or more O-rings 510 can seal a joint between the piston 320 and the cylinder 310 and thereby prevent passage of fluid therebetween. Including when the break check valve 100 is open, the openings 388 in the cylinder 310 can allow fluid to pass into and out of the interior cavity 368 of the cylinder 310 and a pressure inside and outside of the cylinder 310 can thereby equalize.

As shown, the arms 160a,b (160b shown in FIG. 2A) can be formed separately from and be fastened to the plates 430a,b of the valve members 130a,b. In some aspects, the arms 160a,b can be fastened to the plates 430a,b by welding or with weldments at a joint or seam between the arms 160a,b and the plates 430a,b. In other aspects, the arms 160a,b can be fastened to the plates 430a,b using another type of fastener such as, for example and without limitation, a screw or a pin or can slide or snap into position inside the plates 430a,b without the use of any fasteners.

More specifically, in some aspects, the plates 430a,b can define respective recesses 538a,b, which can be sized to receive respective bases of the arms 160a,b. In some aspects, to clear neighboring parts such as the cross member 120 during operation of the break check valve 100 and also fit within the stop cavities 2310a,b (2310b shown in FIG. 1), either or both of the arms 160a,b can define an "S" shape when viewed from a side thereof. Each of the arms 160a,b can be mounted in an orientation or in a plane that is orthogonal to the pivot axis 251.

FIG. 5B is specifically a sectional view of the system 50 after dislocation of the fitting 60 and during closure of the break check valve 100. During closure of the valve members 130a,b, the O-rings 550 and the O-rings 510 can ensure the fluid of the system 50 (e.g., water) only escapes the cylinder 310 from the openings 388, which can be relief holes. As the valve members 130a,b attempt to rotate and the cylinder 310 attempts to slide over the piston 320, each can move only as fast as the piston 320 can evacuate or push the fluid out of the cylinder 310 from the interior cavity 368. The openings 388 can vary in quantity, size, and location to produce any desired pressure profile.

As the piston 320 moves in an axial direction with respect to the cylinder 310 and thereby passes successive openings 388, the sum of the areas of the remaining openings 388 exposed to a portion of the interior cavity 368 between the working end 324 of the piston 320 and the end wall 314 of the cylinder 310 can decrease and thereby impact the speed of further closure of the valve members 130a,b. In some aspects, for example when the valve is in close proximity to a fully open position, large resistance can be created, then less and less resistance as the break check valve 100 closes. As shown, with the valve members 130a,b in a partially closed state, fewer openings 388 allow passage of fluid from inside the interior cavity 368 of the cylinder 310 to outside the cylinder 310 in comparison to the fully open state of the valve members 130a,b shown in FIG. 5A. More specifically, in some aspects, a ratio of the sum of the areas of the openings 388—as viewed along a radial direction of each of the openings 388 or at least along a direction parallel to flow of the fluid through the openings 388—to the volume of the fluid remaining in the interior cavity 368 can remain constant or substantially constant as the valve closure device 230 closes; while in other aspects, a ratio of the sum of the areas of the openings 388 to the volume of the fluid remaining in the interior cavity 368 can increase or decrease as the valve closure device 230 closes. By increasing or decreasing the aforementioned ratio, the speed and acceleration of closing of the valve closure device 230 can correspondingly be increased or decreased. More generally, different valve closure speeds and accelerations can result from adjusting the sizes, quantities, and locations (especially along the axis 101) of the openings 388.

An effective surface area of the plates 430a of the first valve member 130a can equal or can substantially equal an effective surface area of the plate 430b of the second valve member 130b. The effective surface area can be an actual surface area of the corresponding plate 430a,b or a projected surface area as measured along a direction such as, for example, the axis 101 of the break check valve 100. The symmetry of the valve closure device 230—including, for example, the aforementioned effective surface areas—can cancel out any and all horizontal loads acting on components of the valve closure device 230 such that the resultant force on surrounding portions of the break check valve 100 are only along the direction of the axis 101. Furthermore, such symmetry can cause an equal or substantially equal closing speed of each of the valve members 130a,b during closure of same, and can thereby cause simultaneous or substantially simultaneous closure of the valve members 130a against mating portions of the break check valve 100 such as, for example and without limitation, the seal 270. "Substantially" equal or simultaneous generally means that a particular value or property is close enough for any differences to be immaterial to performance of the structure.

FIG. 5C is specifically a sectional view of the system 50 after dislocation of the fitting 60 and after closure of the break check valve 100. While the arm 160a is shown in close proximity to the cross member 120, a gap can be present between arms 160a,b (160b shown in FIG. 1) and the cross member 120 such that no interference occurs between the arms 160a,b and the cross member 120 at all positions or states of the break check valve 100 and, more specifically, the valve members 130a,b, at least to any degree that could interfere with closure of the valve closure device 230. As shown, a volume of a portion of the interior cavity 368 defined between a working end 324 of the piston 320 and the end wall 314 of the cylinder 310 can be greater than zero to ensure that the piston 320 does not bottom out inside the cylinder 310 before closure of the valve closure device 230.

In some aspects, a portion of either or both of the valve members 130a,b or, more specifically, the plates 430a,b can define a hole (not shown), which can be similar in purpose to the holes 128a,b (shown in FIG. 1) defined in the cross member 120 or the openings 378a,b of the seal 270. Such a hole can be in fluid communication with each of the inner cavity of the fitting 60 and the valve inner cavity 112 or can be in fluid communication with a portion of the valve inner cavity 112 on either side of the valve members 130a,b when each of the valve members 130a,b is in the closed position.

FIGS. 6A and 6B are sectional detail view of the valve closure device 230 of FIG. 2A in accordance with another aspect of the current disclosure. FIG. 6A is specifically a sectional detail view of the valve closure device 230 of FIG. 2A taken along line 6A-6A of FIG. 2A in accordance with another aspect of the current disclosure. As shown, the hydraulic dampener 260 can hold a dampening fluid such as, for example and without limitation, an oil in an interior cavity of the hydraulic dampener 260 such as the interior cavity 268 of the cylinder 310. The oil can be mineral oil in some aspects. The dampening fluid can be different than a fluid of the fluid distribution system 50, but like other aspects of the valve closure device 230 disclosed herein the dampening fluid can be configured to resist rotation of the first valve member 130a towards the closed position of the first valve member 130a and the second valve member 130b towards the closed position of the second valve member 130b.

A relief cut or groove or passage 668 can allow passage of the dampening fluid held within the interior cavity 368 of the hydraulic dampener 260 from a first portion 610 of the interior cavity 368 to a second portion 620 (shown in FIG. 6B) of the interior cavity 368. In some aspects, the passage 668 can be defined in an interior surface of the side wall 312 of the cylinder 310. More specifically, passage of the dampening fluid from the first portion 610 to the second portion 620 of the interior cavity 368 can be around the working end 324 of the piston 320, which can be or define an enlarged head of the piston 320. More specifically, a diameter of the working end 324 of the piston 320 can be greater than a shaft 630 of the piston 320. In some aspects, the passage 668 can be defined in an edge surface or interior portion of or through a portion of the piston 320 such as the working end 324 and can extend from the first portion 610 to the second portion 620. In some aspects, a single passage 668 can be defined in the hydraulic dampener 260. In other aspects, the hydraulic dampener 260 can define a plurality of passages 668, each of which can be defined in separate portions of the hydraulic dampener.

During closure of the valve members 130a,b, the O-rings 550 and the O-rings 510 can ensure that the dampening fluid does not escape the cylinder 310 and instead only passes between the first portion 610 and the second portion 620 of the interior cavity 368. In some aspects, a gasket 650 can be positioned between the cylinder 310 and the cylinder block 350 to facilitate a seal therebetween and thereby prevent the dampening fluid from leaving the cylinder 310. As the valve members 130a,b attempt to rotate and the cylinder 310 attempts to slide over the piston 320, each can move only as fast as the piston 320 can evacuate or push the dampening fluid from the first portion 610 to the second portion 620 of the interior cavity 368. In some aspects, as shown, the cylinder 310 can define a single instance of the groove 668. In some aspects, as shown, the cylinder 310 can define a constant width and depth across its length. In some aspects, the groove 668 can vary in quantity, size (in particular, width and depth), and location to produce any desired pressure profile.

As the piston 320 moves in an axial direction with respect to the cylinder 310, the sum of the areas of the one or more grooves 668 can decrease and thereby impact the speed of further closure of the valve members 130a,b. In some aspects, for example when the valve is in close proximity to a fully open position, large resistance can be created, then less and less resistance as the break check valve 100 closes. In some aspects, a ratio of the sum of the areas of the grooves 668—as viewed along an axial or longitudinal direction of each of the grooves 668 or at least along a direction parallel to flow of the fluid through the grooves 668—to the volume of the fluid remaining in the first portion 610 of the interior cavity 368 can remain constant or substantially constant as the valve closure device 230 closes. In other aspects, a ratio of the sum of the areas of the grooves 668 to the volume of the fluid remaining in the first portion 610 of the interior cavity 368 can increase or decrease as the valve closure device 230 closes. By increasing or decreasing the aforementioned ratio, the speed and acceleration of closing of the valve closure device 230 can correspondingly be increased or decreased. More generally, different valve closure speeds and accelerations can result from adjusting the sizes, quantities, and locations (especially along the axis 101) of the grooves 668 and/or by adjusting the viscosity of the oil by using an oil or lower or higher viscosity.

FIG. 6B is a sectional detail view of the valve disclosure device of FIG. 6A taken along line 6B-6B of FIG. 2B. As shown, the side wall 312 and the shaft 630 extending between the mounting end 322 and the working end 324 of the piston 320 can define the second portion 620 of the interior cavity 368.

FIG. 7A is a side elevation view of the system 50 of FIG. 2A showing the full fitting 60, which as shown can be the aforementioned wet barrel hydrant, assembled to the break check valve 100. The fitting 60 can define an axis 61, which can be aligned with the axis 101 of the break check valve 100.

Figure 7B:
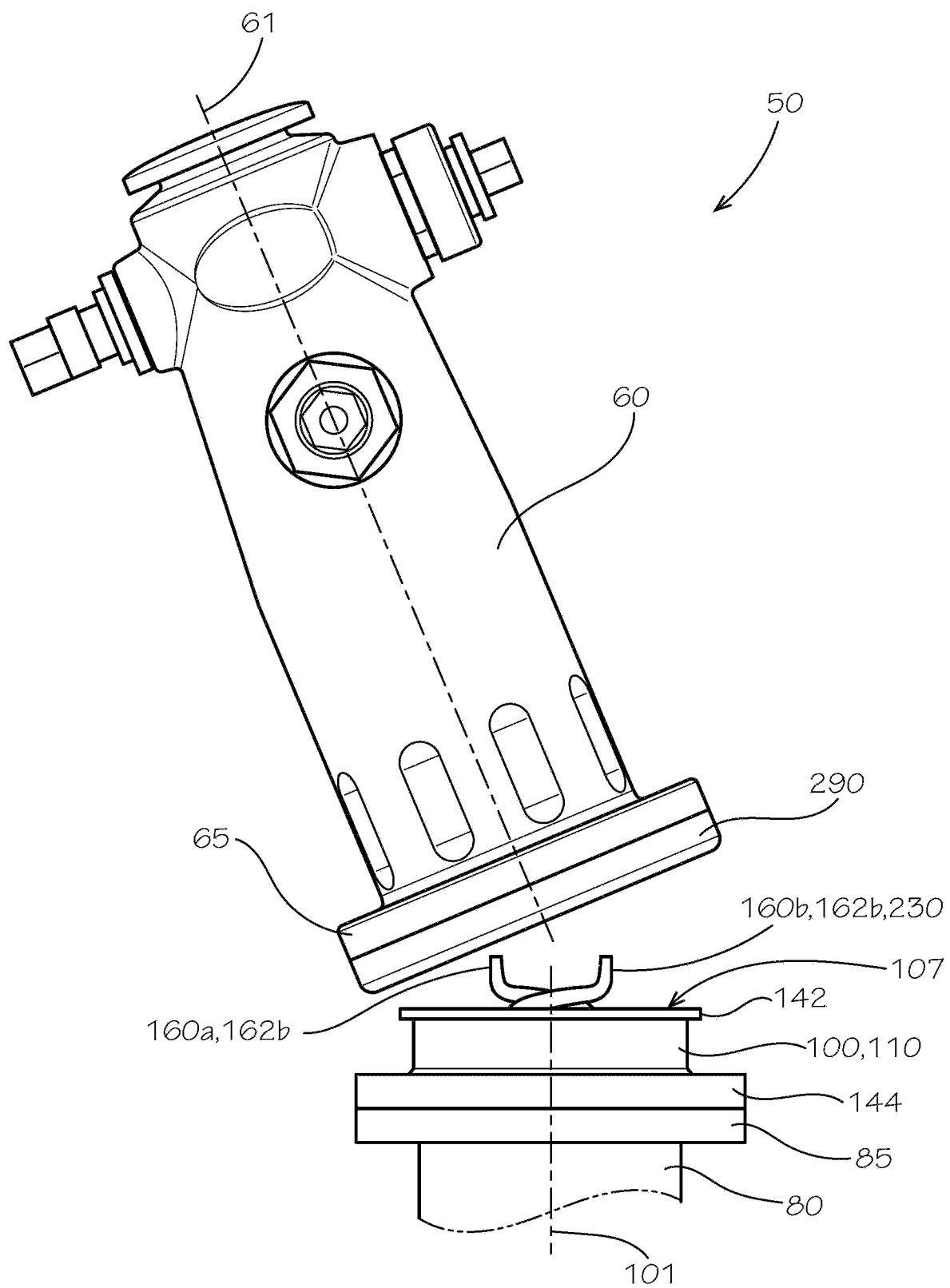
FIG. 7B is a side elevation view of the system of FIG. 2A after dislocation of the hydrant.

FIG. 7B is a side elevation view of the system 50 of FIG. 2A after dislocation of the fitting 60. The break check valve 100 having been activated, the arms 160a,b can now be visible above or beyond the mating surface 107 of the break check valve 100. In some aspects, as shown, closure of the break check valve 100 can be evident by rotation of the valve members 130a,b (shown in FIG. 1) and will based on that closure limit loss of fluid from the system 50, except as desired through any of the one or more holes 128a,b as a way to help show that the break check valve 100 has been activated.

A method of using the break check valve 100 can comprise initiating closure of the break check valve 100 upon dislocation of the fitting 60 from the break check valve 100 by rotation of each of the first valve member 130a and the second valve member 130b as a result of pressure of the fluid of the system 50 against each of the first valve member 130a and the second valve member 130b. The method can comprise resisting rotation or dampening closure of each of the first valve member 130a and the second valve member 130b of the break check valve 100 during closure of the break check valve 100 with the hydraulic dampener 260. In some aspects, more specifically, the method can comprise slowing or dampening the valve members 130a,b before contacting the valve body 110 with the valve members 130a,b. In some aspects, more specifically, resisting rotation or dampening closure of each of the first valve member 130a and the second valve member 130b of the break check valve 100 during closure of the break check valve 100 with the hydraulic dampener 260 can comprise sliding the cylinder 310 of the hydraulic dampener 260 with respect to the piston 320.

In some aspects, sliding the cylinder 310 of the hydraulic dampener 260 with respect to the piston 320 can comprise pushing out of the hydraulic dampener 260, typically under pressure, the fluid held within the interior cavity 368 of the hydraulic dampener 260. In some aspects, sliding the cylinder 310 of the hydraulic dampener 260 with respect to the piston 320 can comprise pushing, typically under pressure, the dampening fluid held within the interior cavity 368 of the hydraulic dampener 260 from the first portion 610 of the interior cavity 368 to the second portion 620 of the interior cavity 368.

A method for using the system 50 or any portion thereof can comprise providing the system 50 or any portion thereof as disclosed herein. The method can comprise maintaining an open position of the valve members 130a,b as long as the fluid of the system 50 flows in the positive flow direction 301 of the break check valve 100. The method can further comprise automatically rotating the valve members 130a,b of the break check valve 100 from the open position to the closed position of the break check valve 100 when the fluid of the system 50 flows in the negative flow direction 302 of the break check valve 100. The method can further comprise the valve members 130a,b during closure changing their respective positions or orientations with respect to the valve body 110 of the break check valve 100. As also shown, the method can comprise the valve members 130a,b in the closed position of the break check valve 100 substantially stopping or completing stopping flow of the fluid from the system 50. By "substantially stopping flow," including as shown with respect to exemplary aspects disclosed herein, it is meant that all flow is stopped except for any incidental flow from valve due to minor gaps between the parts when the valve is closed, any purposeful backflow of the fluid, or purposeful venting or streaming of water as described below—such as through the holes 128a,b defined in the cross member 120 to alert passersby of a problem with the fitting 60. In some aspects, leakage due to gaps and any purposeful venting of water as described can measure less than 5% of total flow.

The method can comprise expelling a limited stream of water from the break check valve 100 through holes such as the one or more holes 128a,b defined in a one of the valve body 110 when the check valve 100 is in the closed position to indicate closure of the break check valve 100 and a resulting need for attention and service by appropriate service personnel. In some aspects, the method can comprise expelling a stream of water from the break check valve 100 and through the cross member 120 or the valve members 130a,b of the break check valve 100. For example, the stream of water could be a focused jet extending high enough into the air (a minimum of five feet, in some aspects, to reach above a top of a parked vehicle) for one to notice it. In some aspects, the method can comprise expelling the stream of water from the break check valve 100 and through a gap defined between the cross member 120 or the valve members 130a,b and the valve body 110 of the break check valve 100. By expelling water from the break check valve 100 when the break check valve 100 is closed, the valve can, as noted above, effectively and clearly indicate to passersby that something may be amiss with the fitting 60 and specifically that the fitting 60 may be dislocated from its usual position, giving them and any nearby public safety personnel the ability to notify responsible parties that the fitting 60 requires attention.

In some aspects, rotating the valve members 130a,b of the break check valve 100 can comprise rotating a pair of valve discs or plates 430a,b about the pivot pin 240 of the break check valve 100 from the open position to the closed position. In some aspects, rotating the valve members 130a,b of the break check valve 100 can comprise expelling a hold-open bar (not shown) from the break check valve 100 and thereby allowing rotation of the valve members 130a,b within the valve body 110 from the open position to the closed position. Furthermore, rotating the valve members 130a,b of the break check valve 100 can comprise slowing the speed of the valve members 130a,b proximate to the closed position with structures positioned between the valve body 110 and the valve closure device 230 and, more specifically, the valve member 130a,b. In some aspects, for example, slowing the speed of the valve closure device 230 can comprise contacting the valve members 130a,b with a biasing member (not shown) or a fluid-filled piston.

The method can comprise installing the fitting 60 at any angular position about the axis 101 with respect to an angular position of the break check valve 100 without affecting the ability of the break check valve 100 to remain closed when the fitting 60 is coupled to the break check valve 100 and open when the fitting 60 is separated from the break check valve 100. This rotation of the fitting 60 to a desirable angular position based on the availability of multiple angular positions is called "clocking" of the fitting 60. The method can comprise re-using the break check valve 100 as-is after actuation of the break check valve 100 and after coupling a replacement fitting 60 to the break check valve 100.

In some aspects, the break check valve 100 and various components thereof can be formed from or comprise an iron (including cast iron and ductile iron), bronze, or steel material including stainless steel or even a plastic (e.g., polymeric) or composite material, which can be reinforced with fibers. In some aspects, any suitable materials can be used. In some aspects, the break check valve 100 and various components thereof can be formed using casting and/or machining processes. In some aspects, any suitable processes can be used.

As shown, the break check valve 100 can be easily replaced by a new break check valve 100, or the break check valve 100 can replace an older style valve or be installed where no break check valve is currently installed. The break check valve 100 can also be reset without replacement or modification upon reinstallation of the fitting 60 by returning the components of the break check valve 100 to their respective original positions.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve closure device for a break check valve, the device comprising:
   a first valve member configured to rotate from an open position to a closed position only when a pipe system fitting initially coupled to the break check valve is separated from the break check valve;
   a second valve member configured to rotate from an open position of the second valve member to a closed position of the second valve member only when the pipe system fitting initially coupled to the break check valve is separated from the break check valve; and
   a hydraulic dampener coupled to each of the first valve member and the second valve member in each of the open position and the closed position of each of the first valve member and the second valve member, the hydraulic dampener configured to resist rotation of the first valve member towards the closed position of the first valve member and the second valve member towards the closed position of the second valve member.

2. The device of claim 1, wherein the hydraulic dampener comprises:
   a cylinder; and
   a piston slidably coupled to and positioned at least partially within the cylinder, one of the piston and the cylinder coupled to each of the first valve member and the second valve member.

3. The device of claim 2, wherein:
   the one of the piston and the cylinder is coupled to the first valve member with a first rigid member; and
   the one of the piston and the cylinder is coupled to the second valve member with a second rigid member.

4. The device of claim 3, wherein the cylinder is coupled to the first valve member with the first rigid member, and wherein the cylinder is coupled to the second valve member with the second rigid member.

5. The device of claim 4, wherein:
   the hydraulic dampener comprises a cylinder block; and
   the cylinder is secured to the cylinder block.

6. The device of claim 1, wherein an effective surface area of the first valve member substantially equals an effective surface area of the second valve member.

7. The device of claim 1, wherein the hydraulic dampener holds a fluid in an interior cavity of the hydraulic dampener, the fluid configured to resist rotation of the first valve member towards the closed position of the first valve member and the second valve member towards the closed position of the second valve member.

8. The device of claim 1, wherein the hydraulic dampener holds a dampening fluid in an interior cavity of the hydraulic dampener, the dampening fluid being different than a fluid of a fluid distribution system for which the hydraulic dampener is configured, the dampening fluid configured to resist rotation of the first valve member towards the closed position of the first valve member and the second valve member towards the closed position of the second valve member.

9. A break check valve comprising:
   a valve body defining a valve bore extending from a first axial end to a second axial end; and
   the valve closure device of claim 1, the valve closure device positioned within the valve body, the hydraulic dampener further coupled to the valve body.

10. The break check valve of claim 9, further comprising a position block secured to the valve body and defining a pivot bore, the hydraulic dampener being fixably secured to the position block.

11. The break check valve of claim 9, wherein the valve closure device comprises:
    a cylinder; and
    a piston slidably coupled to and positioned at least partially within the cylinder, one of the piston and the cylinder coupled to each of the first valve member and the second valve, an axis of each of the piston and the cylinder being aligned with an axis of the valve bore.

12. The break check valve of claim 9, further comprising a first arm and a second arm, the first arm extending from the first valve member but not past a mating surface of the valve body when the first valve member is in the open position, and the second arm extending from the second valve member but not past the mating surface of the valve body when the second valve member is in the open position.

13. The device of claim 1, wherein an axis of the hydraulic dampener is aligned with or parallel to a centerline or line of substantial symmetry of the valve closure device.

14. A system comprising:
a break check valve comprising:
  a valve body defining a mating surface at a first axial end, the valve body defining a valve bore, the valve bore extending from a first axial end to a second axial end;
  a first valve member positioned within the valve body and configured to rotate from an open position to a closed position;
  a second valve member positioned within the valve body and configured to rotate from an open position of the second valve member to a closed position of the second valve member; and
  a hydraulic dampener coupled to each of the valve body, the first valve member, and the second valve member, the hydraulic dampener configured to resist rotation of each of the first valve member and the second valve member during closure of the break check valve; and
a pipe system fitting coupled to the mating surface of the break check valve, the break check valve configured to remain open as long as the pipe system fitting remains coupled to the break check valve and close upon dislocation of the pipe system fitting from the break check valve.

15. The system of claim 14, wherein the break check valve further comprises a first arm and a second arm, the first arm not extending past the mating surface of the valve body when the first valve member is in the open position, and the second arm not extending past the mating surface of the valve body when the second valve member is in the open position.

16. The system of claim 14, wherein the pipe system fitting is a wet barrel hydrant, and wherein the break check valve is configured to close upon dislocation of the pipe system fitting from the break check valve by rotation of each of the first valve member and the second valve member to the respective closed positions.

17. The system of claim 14, wherein the hydraulic dampener comprises:
a cylinder; and
a piston slidably coupled to and positioned at least partially within the cylinder, one of the piston and the cylinder coupled to the valve body and another of the piston and the cylinder coupled to each of the first valve member and the second valve member.

18. A method of using a break check valve, the method comprising:
keeping the break check valve open as long as a pipe system fitting coupled to the break check valve remains coupled to the break check valve;
initiating closure of the break check valve upon dislocation of a pipe system fitting from the break check valve by rotation of each of a first valve member and a second valve member as a result of fluid pressure against each of the first valve member and the second valve member, the break check valve comprising:
  a valve body defining a mating surface and a valve bore, the valve bore extending from a first axial end to a second axial end;
  the first valve member positioned within the valve body;
  the second valve member positioned within the valve body; and
  a hydraulic dampener coupled to each of the valve body, the first valve member, and the second valve member; and
dampening closure of each of the first valve member and the second valve member of the break check valve during closure of the break check valve with the hydraulic dampener.

19. The method of claim 18, wherein the hydraulic dampener comprises a cylinder and a piston, the piston slidably coupled to and positioned at least partially within the cylinder, one of the piston and the cylinder coupled to the valve body and another of the piston and the cylinder coupled to each of the first valve member and the second valve member, wherein dampening closure of each of the first valve member and the second valve member of the break check valve during closure of the break check valve with the hydraulic dampener comprises sliding the cylinder of the hydraulic dampener with respect to the piston.

20. The method of claim 19, wherein sliding the cylinder of the hydraulic dampener with respect to the piston comprises pushing out of the hydraulic dampener a fluid held within an interior cavity of the hydraulic dampener.

21. The method of claim 19, wherein sliding the cylinder of the hydraulic dampener with respect to the piston comprises pushing a fluid held within an interior cavity of the hydraulic dampener from a first portion of the interior cavity to a second portion of the interior cavity.

* * * * *